United States Patent [19]

Carlin et al.

[11] Patent Number: 4,850,223

[45] Date of Patent: Jul. 25, 1989

[54] LEAK DETECTOR

[75] Inventors: John A. Carlin; Robert B. Guberud; William L. Mobeck, all of Denver, Colo.

[73] Assignee: TankTech, Inc., Denver, Colo.

[21] Appl. No.: 75,046

[22] Filed: Jul. 17, 1987

[51] Int. Cl.[4] .............................................. G01M 3/38
[52] U.S. Cl. ..................................... 73/49.2; 73/292; 73/313
[58] Field of Search ................... 73/49.2 T, 305, 312, 73/313, 293, 292; 340/605

[56] References Cited

U.S. PATENT DOCUMENTS

| | | | |
|---|---|---|---|
| Re. 31,884 | 5/1985 | Hansel et al. | 73/49.2 |
| 2,054,212 | 9/1936 | Bacon | 73/82 |
| 3,537,298 | 11/1970 | Kapff | 73/49.2 |
| 3,538,745 | 11/1970 | Wright et al. | 73/49.2 |
| 3,538,746 | 11/1970 | Jacobs et al. | 73/49.2 |
| 3,805,613 | 4/1974 | Stone | 73/313 |
| 3,841,146 | 10/1974 | Cross et al. | 73/49.2 |
| 4,033,175 | 7/1977 | Shiwaku et al. | 73/49.2 |
| 4,186,591 | 2/1980 | Mooney | 73/49.2 |
| 4,353,245 | 10/1982 | Nicolai et al. | 73/49.2 |
| 4,386,525 | 6/1983 | Mooney | 73/49.2 |
| 4,404,844 | 9/1983 | Hegler | 73/49.2 |
| 4,453,400 | 6/1984 | Senese et al. | 73/49.2 |
| 4,505,148 | 3/1985 | Zajac | 73/49.2 |
| 4,532,795 | 8/1985 | Brayman et al. | 73/40 |
| 4,571,987 | 2/1986 | Horner | 73/49.2 |
| 4,586,033 | 4/1986 | Andrejasich | 73/40 |
| 4,604,893 | 8/1986 | Senese et al. | 73/49.2 |
| 4,672,842 | 6/1987 | Hasselmann | 73/49.2 |
| 4,732,035 | 3/1988 | Lagergren et al. | 73/49.2 |

FOREIGN PATENT DOCUMENTS 0004316  12/1982  World Int. Prop. O. ............ 73/293

Primary Examiner—Stewart J. Levy
Assistant Examiner—Joseph W. Roskos
Attorney, Agent, or Firm—Dorr, Carson, Sloan & Peterson

[57] ABSTRACT

Apparatus for detecting leaks in fuel storage tanks. A float suspended in the tank liquid determines liquid levels and transmits the liquid level information via an infrared beam to a probe processor in the upper port of the tank. The probe processor stores a plurality of level indications for subsequent uploading to an external computer which analyzes the level information to generate leakage rate information.

26 Claims, 11 Drawing Sheets

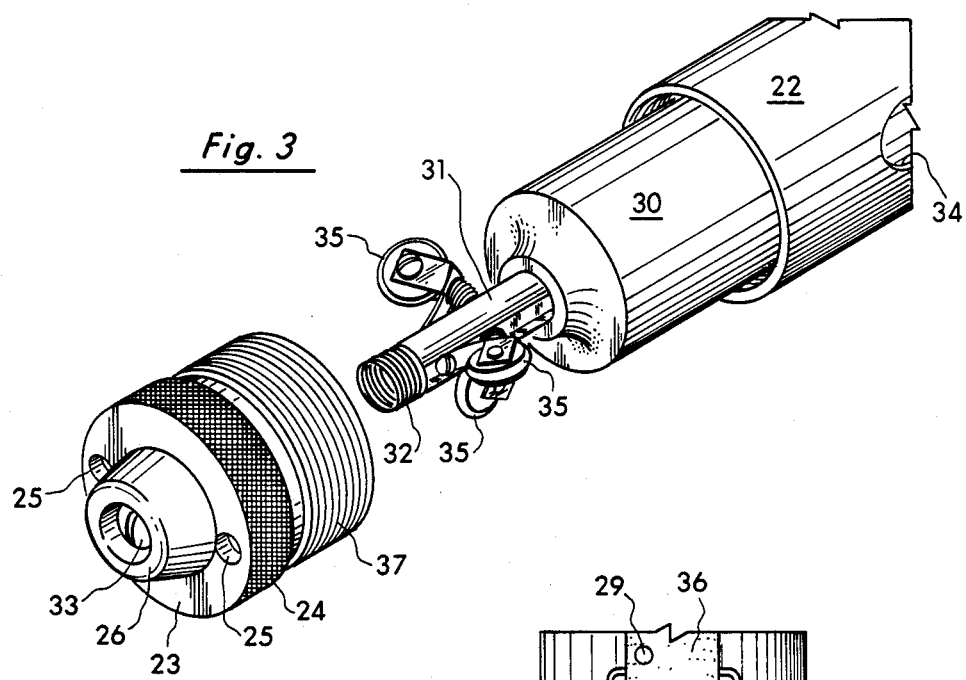
Fig. 3
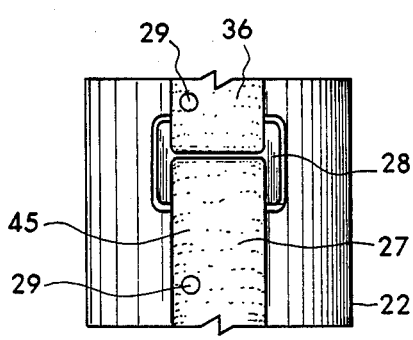
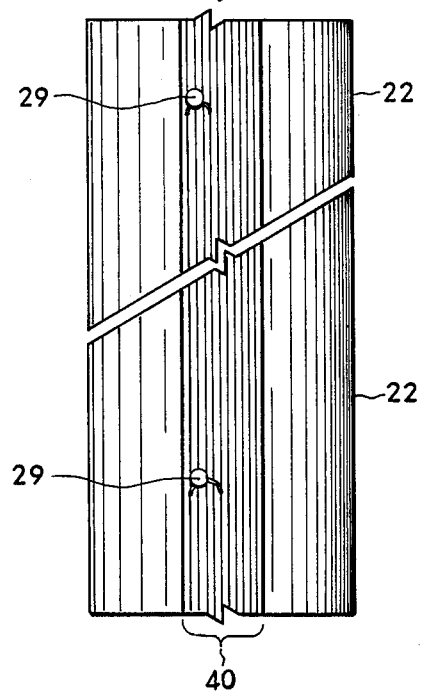
Fig. 4

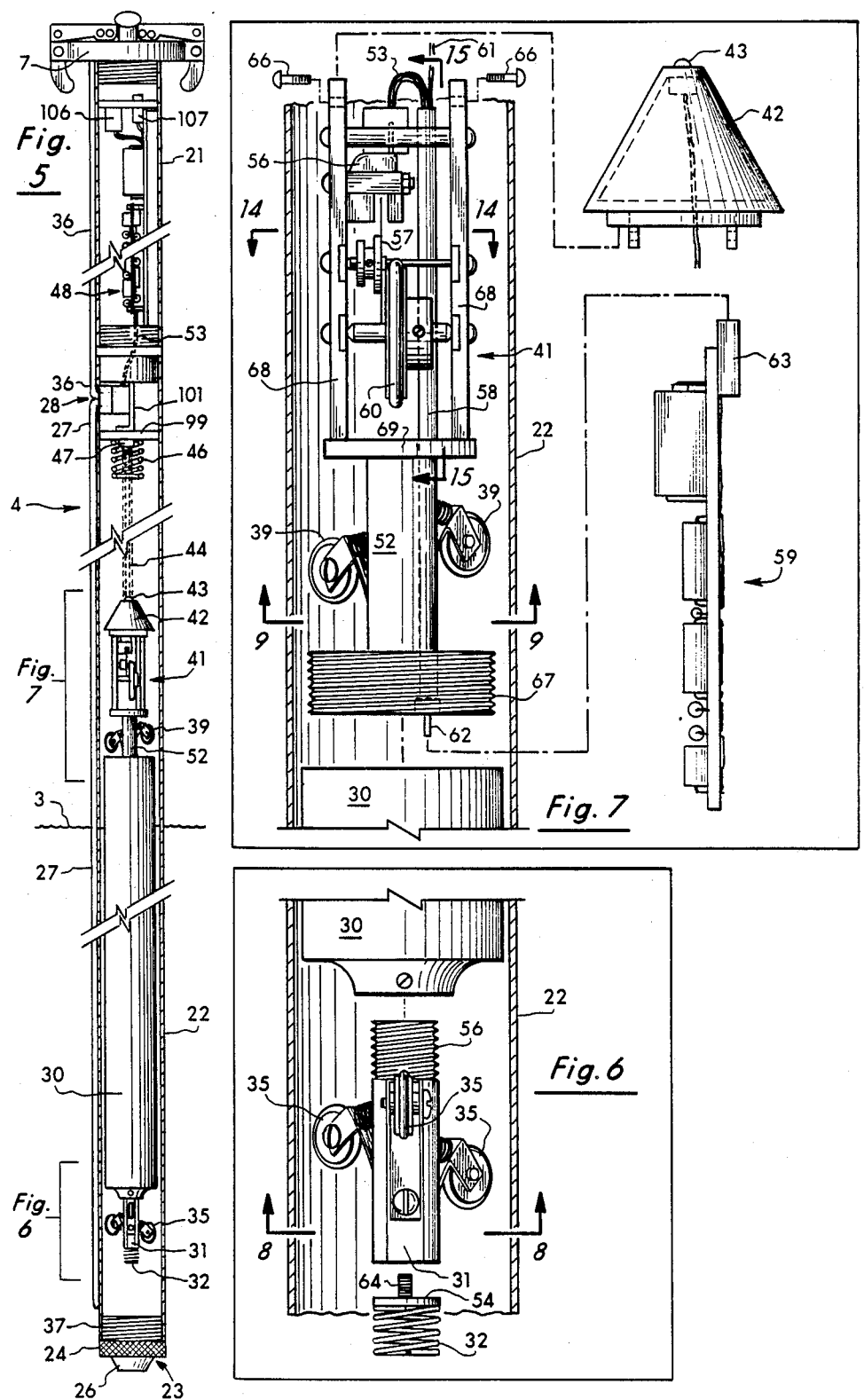

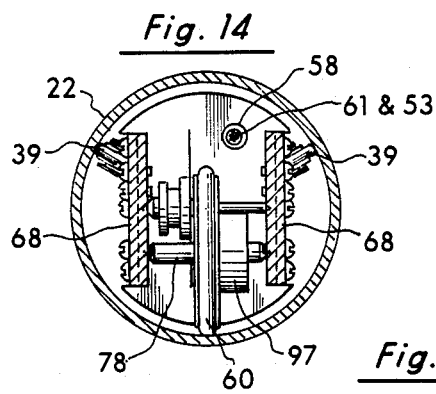
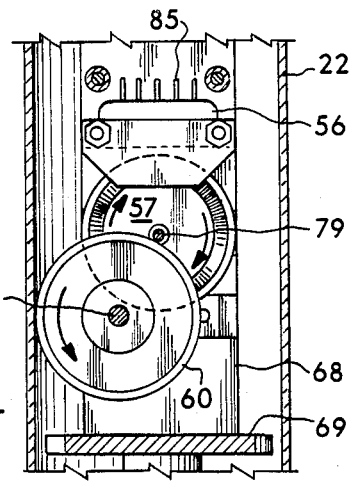
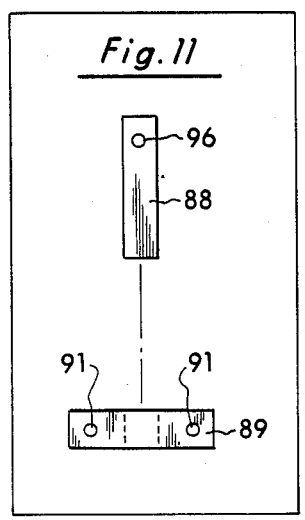
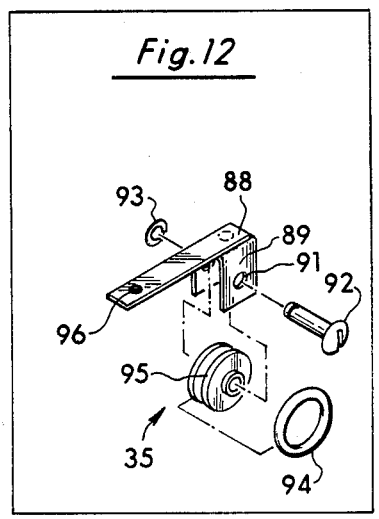
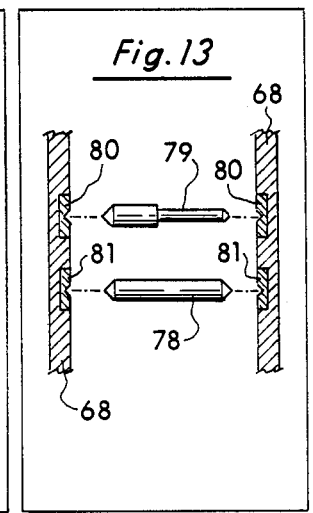
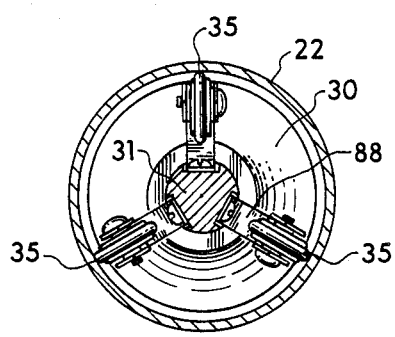
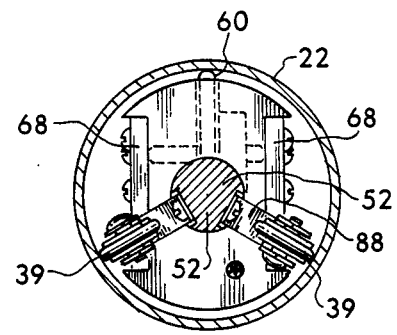

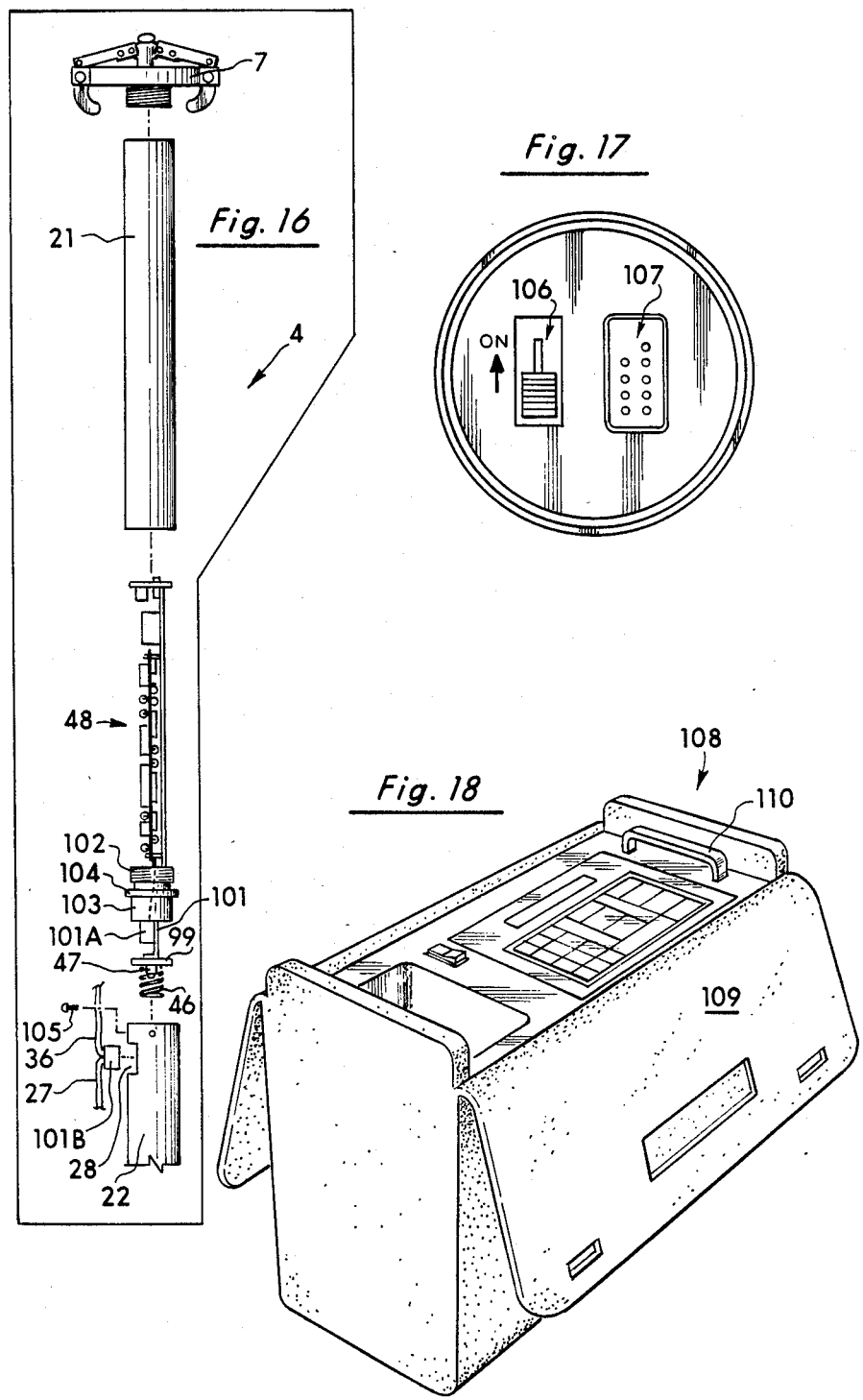

FLOAT PROCESSOR

PROBE PROCESSOR

LEAK DETECTOR

FIELD OF THE INVENTION

This invention relates to the provision of apparatus for and a method of detecting leaks in storage tanks and, in particular, for detecting leaks in underground tanks that store hydrocarbon products. This invention further relates to a method of collecting and processing data regarding the leakage rate of underground storage tanks.

BACKGROUND OF THE INVENTION

Leaking tanks and, in particular, leaking underground fuel storage tanks presently pose a significant economic and environmental problem. There are thousands of underground fuel storage tanks in use in service stations and the like throughout the world and, over a period of time, leaks inevitably will occur in many of these tanks. Each leak permits the stored hydrocarbons (fuel) to flow into the ground and into the surrounding environment. Even small leaks are unacceptable since over a period of time, a small leak can contaminate a large area and render it unfit for habitation - particularly if it is a residential area. A leak can also allow ground water to flow into a tank and render the stored fuel unfit for further use. Leaks can also provoke litigation by damaged parties and can result in sizeable damage awards against the owners/operators of the premises on which the leaking tank is situated. Thus, it is most desirable that tank leaks be prevented and/or detected as soon as possible so that the necessary corrective measures can be taken.

The problem is of such significance that the Environmental Protection Agency (EPA) has recently proposed that underground fuel tanks of a proposed date of installation be replaced within ten years. While all tanks have a limited life, a high quality properly installed tank can be expected to last far longer than ten years. Therefore, while the EPA rule might perhaps reduce leakage from some tanks, the rule unfortunately lumps high quality and low quality tank installations together. This penalizes the owner/operators of high quality well maintained tanks installation by requiring them to abide by the rules and regulations that should be applicable only to low quality installations.

The industry is aware of the problem of leaking underground fuel storage tanks and for the most part, is using the best possible available apparatus to test the tanks currently in use. However, none of this apparatus is ideal. The ideal tank testing apparatus should meet five prerequisites. These are (1) the apparatus should be of sufficient accuracy to measure the extremely small leakage rates that are required for a tank to meet today's environmental standards, (2) the apparatus must be easy to use so that it can be installed and operated by relatively unskilled personnel as opposed to the use of laboratory level technicians, (3) the operation of the apparatus should not interfere with the normal operation of the filling station or facility of which the tested tank is a part, (4) the results of the test should not be subject to fraud or manipulation by anyone wishing to alter test results, and (5) it is also of great importance to eliminate any operator adjustments or operator interpretation which could cause errors as to how the tank is behaving.

It is necessary that the leak detection apparatus be extremely sensitive (it can detect leaks in the range of 0.02 gallons per hour or less) so that very slight leakages can be detected in a relatively short period of time. It is extremely difficult to detect the loss (or gain) of 0.02 gallons of liquid per hour in a storage tank capable of storing 10,000 gallons or more. For example, in a nine foot diameter tank twenty-one feet long that is half full, the removal of one gallon of gasoline lowers the fluid level 0.00629 inches. The loss of 0.02 gallons per hour would cause a fluid level drop of 0.0001257 inches or 125.7 micro inches per hour. It is difficult to measure changes in fluid level of this magnitude. Also, even when such a change in the liquid level can be accurately and reliably measured, the change may be due to other factors such as a change in fluid density, water table, vapor pockets, vibration, atmospheric pressure, etc. or a change in temperature or by evaporation. This requires that the measurement apparatus, detect and compensate for the level changes caused by these other factors.

Many of the currently available tank testing devices, while reasonably sensitive and accurate, are complex and require the skills of laboratory level technicians in their operation. This precludes the use of relatively unskilled personnel and increases testing costs. Also, many of the currently available testing devices require the placement of apparatus immediately above the fill pipe area of the tank that is to be tested. This is disadvantageous. Tank fill pipes are often situated in the filling station areas that are used by customers during the normal operation of the station. The testing of a tank with apparatus positioned above the fill pipe area requires that portion of the filling station to be shut down and made unavailable to the users of the station. Further, the tank under testing has to be out of service during the testing period. This, causes a loss of revenue to the tank owners. And finally, some methods require the tank to be completely full of product (at great expense to the owner) many hours before the start of testing. Other methods require that the tank be emptied. Some even require the tank to be pressurized. This could damage the tank and create a leak by the test procedure itself - certainly if the test was performed many times over the life of the tank.

Even if apparatus could be found that meets all of the above mentioned prerequisites, the apparatus would be ineffective if provisions are not made for safeguarding the integrity of the test data. In other words, there may be instances in which persons may wish to alter the test results to conceal the fact that a tank is leaking. Obviously, the purposes of the test are subverted if the integrity of the test results is not protected.

Also, the manual logging of any test data by a technician attempting to read/observed minute changes on their instrumentation is not desirable. Many of the known prior art arrangements generate tank leakage information at the test site wherein the data is read and/or recorded manually by the technician for further use. This is most undesirable due to the inherent reliance of human interpretation of the data derived by such instrumentation. Prior systems may record leakage data, but they are inherently incapable of acquiring accurate data because of the need of interpreting the acquired data and are therefore completely ineffective as a leak detection device. Prior methods and apparatus require manual recording and interpretation of tank leakage data on the spot. Since the information is manually recorded, it is subject to alteration or human reinterpretation by persons who might knowingly or unintentionally conceal the fact that a tank is leaking.

It may therefore be seen that it is a problem in the art to provide tank testing equipment that is accurate in its operation, that can be operated by relatively unskilled personnel, that does not require human interpretation or recording, that does not interfere with the normal operation of the filling station including the pumping of the tested tank, and that provides for the safekeeping of the test results so as to prevent their alteration either by compromise or by human error.

DISCUSSION OF THE PRIOR PATENTS

The patents discussed in the following numbered paragraphs relate to the detection of leaks and were uncovered during a prior art search prior to filing the present application.

1. U.S. Pat. No. 2,054,212 to Bacon of 9-15-36

Discloses an arrangement using a float, a wire, and a drum for indicating fluid levels. The drum is calibrated and the amount that the drum rotates, as the float and the wire move, provides an indication of present fluid level.

2. U.S. Pat. No. 3,537,298 to Kapff of 11-3-70

Discloses a flow detector for detecting changes in fluid levels.

3. U.S. Pat. No. 3,538,745 to Wright et al. of 11-10-70

Uses a float 72 which detects fluid level changes and generates an output signal representing the fluid level. The output signals are applied to circuitry 18 which drives an indicator 80 representing the current fluid level.

4. U.S. Pat. No. 3,538,746 to Jacobs et al. of 11-10-70

Discloses an arrangement in which the differential pressure on a diaphragm 30 measures the fluid level 44 in a tank 12. A signal representing the fluid level is applied to an indicator device 38 positioned above the tank.

5. U.S. Pat. No. 3,805,613 to Stone of 4-23-74

Discloses an arrangement that uses a pool of mercury in a U-shaped tube to indicate fluid level.

6. U.S. Pat. No. 3,841,146 to Cross of 10-15-74

Discloses an arrangement using external tanks and pumps to detect leaks. This patent discusses the importance of thermal compensation in gas tank measurements. For example, one degree of Fahrenheit change in temperature corresponds to an apparent loss of six gallons in a 10,000 gallon tank. This is 120 times a leak of 0.05 gallons per hour. The Cross arrangement requires that the tank be filled before the test and a period of time is required to circulate the contents of the tank to achieve uniform product temperature.

7. U.S. Pat. No. 4,033,175 to Shiwaku et al. of 7-5-77

Discloses an arrangement that uses a balance element 43 to measure the leakage of gas in a container 28.

8. U.S. Pat. No. 4,186,591 to McOney of 2-5-80

Discloses an arrangement that uses a float 31 together with an indicator 59 positioned above the tank to indicate the fluid level within the tank. The arrangement of this patent can only operate when the fluid in the tank rises into the fill-pipe area.

9. U.S. Pat. No. 4,353,245 to Nicolai of 10-12-82

Discloses an arrangement for monitoring leaks during what is termed the normal operating conditions of a gas station. This system also detects the entry of liquid into a tank from an outside source such as ground water. The arrangement sets forth a system for measuring fluid level changes between equally distant time intervals such as 100 microseconds. It is asserted that the system can detect leaks while pumping is taking place. The magnitude of the leaks that can be detected by Nicolai during pumping is not specified.

10. U.S. Pat. No. 4,386,525 of 6-7-83

Uses a capacitance probe 29 to indicate fluid levels. Under the teachings of this patent, the tank is filled with gasoline to a level where the liquid is actually in the fill-pipe. Temperature probes are inserted to compensate for temperature and a capacitive probe is utilized to measure variations in the level changes due to leakage. The patent sets forth a separate sensor for determining the lowering of the level due to evaporation. By compensating for temperature and evaporation, a more accurate determination of leakage is obtained.

11. U.S. Pat. No. 4,404,844 to Hegler of 9-20-83

Discloses a system in which the pressure on a suspended transducer 10 causes output signals to be generated and applied to elements 15 and 16 to indicate fluid level.

12. U.S. Pat. No. 4,453,400 to Senese of 6-12-84

Discloses an arrangement for measuring leaks as small as 0.02 gallons of liquid per hour. The invention makes use of a conventional light source, a photo resistor detector, and a hollow elongated float. The float engages the fluid in a vertical orientation and utilizes weights to maintain vertical position. Changes in the level of the tank fluid are based upon changes in the modulation characteristics of the signal. A float 38 moves with changes in the fluid level. A reservoir 44 contains ink 19 and a detector 36. The movement of the float controls the amount of ink 19 that covers the detector. This varies the output of the detector to indicate changes in fluid level within the tank.

13 U.S. Pat. No. 4,505,148 to Zajac of 3-19-85

Discloses an arrangement in which changes in fluid level are detected by a float which produces step output voltage changes indicative of the fluid level changes. The system is proposed to be operated at night when the tanks are not being pumped.

14. U.S. Pat. No. 4,532,795 to Brayman of 8-685

Measures the flow of pressurized fluid to a tank to see if the tank is leaking.

15. U.S. Pat. No. 4,571,987 to Horner of 2-25-86

Uses pressure to indicate fluid levels. The system measures temperature to determine whether fluid level changes are due to temperature changes or due to leaks. A float 40 holds a temperature probe 46. The system discloses a vertical oriented probe extending substantially the entire height of the tank with the probe being filled with the material having the same coefficient of the expansion as the fluid in the tank.

16. U.S. Pat. No. 4,586,033 to Andrejsich of 4-29-86

Discloses an arrangement wherein a number of holes are drilled around a storage tank and floatation sensors are placed in these wells to detect whether the fluid in the wells is conductive, as is the case for water, or nonconductive, as is the case for gasoline.

17. U.S. Pat. No. 4,604,893 to Senese of 8-12-86

Discloses an arrangement that is similar to the patent described in Paragraph 12 above by the same inventor.

18. Reissue U.S. Pat. No. 31,884 to Hansel et al.

Discloses an arrangement in which a sensor 12 weight changes with changes in fluid level in a tank. The weight change is detected by transformer 24 and fed to read-out circuitry elements 27 through 29.

It can be seen from the above that a number of arrangements have been proposed for measuring fluid levels and fluid level changes in underground tanks. While all of the above discussed arrangements may be suitable for the purposes for which they were conceived, they all suffer from one or more disadvantages with regard to the goal of accurately measuring extremely small leakage rates in underground tanks with a minimum of inconvenience to the owner/operator of the tanks and with the use of relatively unskilled personnel in the operation of the measuring devices. For example, the arrangements discussed in numbered paragraphs 1, 3, 4, 6, 8, 9, 10, 12, 15, 17, and 18 all require the use of complex apparatus immediately over the fill-pipe area of the tank being monitored. The use of apparatus immediately over the fill-pipe of a tank is inconvenient and is disruptive to the operation of the filling station or facility of which the tank is a part. The reason for this is that the tank fill-pipes are often in heavy vehicle traffic areas of the filling station.

It is also most undesirable to take a tank out of service to test for tank leakage. To take a tank being tested out of service means that fluid cannot be pumped for the duration of the test. The prohibition against testing also includes many hours prior to testing to allow a freshly filled tank to settle with respect to temperature. Also, the use of apparatus of the complexity disclosed by these patents requires laboratory type technicians making sensitive adjustment subjectively rather than relatively unskilled personnel to operate the equipment.

Others of the above discussed arrangements, while possibly being suitable for the purposes for which they were originally conceived, are incapable of measuring the relatively small fluid level changes in large underground tanks that is required for today's compliance with the laws, rules, and regulations with which today's industry must comply.

It can therefore be seen that it is a problem to provide apparatus that can accurately measure small changes in the fluid level of underground tanks with the accuracy acquired by today's environment. It is also a problem to provide apparatus that is not of laboratory complexity and that can be operated and maintained by relatively unskilled personnel and which is cost effective and affordable so tank owner/operators can have tests performed without having to completely fill the tank or to take the tank out of service and lose revenue during test periods. It is a further problem to generate test data that is not subject to manipulation by persons desiring to conceal tank leakage information or, erroneous operator interpretation or subjectiveness with respect to interpretation of instrumentation which inherently relies on human conclusions.

SUMMARY OF THE INVENTION

The present invention overcomes the above discussed disadvantages and achieves an advance in the art by providing improved apparatus for measuring fluid level changes in underground tanks. The provided apparatus is accurate and can be installed with a minimum of inconvenience to the establishment associated with the tank and can be operated by relatively unskilled personnel. The provided apparatus can detect very small changes in volumetric parameters of fluids in underground storage tanks. The invention also comprises a method whereby relatively unskilled personnel can install, operate, monitor, and maintain leakage testing apparatus in a plurality of underground tanks concurrently. The invention is further advantageous in that the provided apparatus, which requires no operator adjustments, can be installed and operated by personnel who have only a minimal knowledge of the equipment's operation and who have no direct access to the test data. This protects the integrity of the test results.

The provided apparatus is intended for use whenever fluids are stored in either under or above ground tanks and where it is desirable to easily and economically test the tanks for leakage while the gas station or facility associated with the tested tanks continues in operation. The testing provided by the present invention may include the testing of any associated plumbing that is connected to the tank under test. This can be done by turning on any connected pumps while not operating or opening any fuel dispenser nozzles. Also, the tank can be tested with any level of product in it, including up into the fill pipe. It is important to understand, that a volumetric method must have some "volume" of product in which to measure, i.e., an empty or near empty tank would be impractical to test.

The invention further relates to a method for effectively retrieving, processing, and disseminating the data that is obtained from the test. The method of the present invention is implemented by the provision of a plurality of test probes and related equipment on a technician's truck. The technician is responsible for the testing of a plurality of tanks concurrently. This makes it possible for a single truck and a single technician to test many tanks with minimum equipment so as to make the test affordable. This increases the desirability of frequently testing the tanks.

A test is initiated at a particular site when the technician unloads the parts of a test probe from his truck and assembles the probe. He then connects the probe to a field processor which initializes the probe to prepare it for a test. The technician then removes the cap from the fill-pipe of the tank to be tested, actuates a switch to activate the probe, and inserts the probe into the tank. The top of the probe includes a cover similar to the regular cap of the tank fill-pipe. For example, the technician would select a 3 inch probe cover to test a tank with a 3 inch fill pipe. The same probe could be used at a site with 4 inch fill pipes by selecting the appropriate size probe cover, etc. The technician departs after he installs the probe which fits fully into the tank and fill pipe and is then free to install test probes in other tanks either at the same or at other sites.

Ideally, the test probe is left in the tank for an extended period of time, for example, if installed in the afternoon, it is left in the tank over night. The tank fluid level, the temperature and barometric readings are tested continuously for up to ten hours of data storage with either an automatic default start time or manual predetermined start time. It is important to understand that if the test probe is installed for as little as, say, fifteen minutes, the device can detect a leak behavior in the tank. However, the longer the test period, the greater the "confidence interval" of any voidage rate. Since all acquired data is valid data in the present invention, sudden and large drops in fluid level that occur are to be attributed to normal depletion of the tank. However, there will be times during which the tank is not being pumped. It is these quiet periods that become important when the data is analyzed later by the program model which interprets the behavior of the tank. Since the probe test apparatus records all fluid level data activity along with temperature and barometric reading and stores these readings in memory organized into "minute logs" and "second logs", there will always be a large number of readings representing periods during which the tank is not being pumped. Therefore, when the recorded data representing (1) any detected differences in fluid level change, (2) multiple temperature points, and (3) the barometric pressure within the tank, are later subjected to the behavioral program model, the results are a determination of a voidage rate (leakage) if one exists.

A processor on the float device of the present invention dampens any raw level data, e.g., vibration due to a passing trucks in the area, or, wind which may blow down the tank's vent pipe, etc. This processor smoothing is accomplished by an averaging and variance routine and filtered data is transmitted through the use of an infrared link to the top of the probe where a second processor organizes the received data, along with the sensed temperature and barometer readings into the above mentioned "second log" and "minute log" format for storage into the probe memory. Thus, by the end of the test interval such as for example over night, the probe has stored enough readings (data points) to provide a well established assessment of the behavior of the subject tank.

The technician returns to the test site at the end of the test interval, retrieves the probe from the tank being tested and replaces the original cap on the tank fill-pipe. The technician then uploads the stored data points acquired by the test probe into a field processor. This data retrieval is accomplished by the technician as he connects the processor portion of the probe to a field processor situated on his truck. He then disassembles the probe and inserts it into his truck for subsequent use on another test.

The technician later causes the field processor to upload the test information (data points) stored in the memory of the probe processor. The memory of the probe processor stores not only the test data, but also stores permanent information regarding the probe such as the probe serial number, the processor code, and an indication as to how many times the probe has been used. All of this information is readout of the probe processor and stored in the field processor. The truck field processor also increments a counter in the probe memory by one to indicate the number of times the test probe has been used. The information stored in the truck field processor and pertaining to the test of a tank is termed to be a test packet.

The technician has a plurality of such test probes on his truck and he may now move to other sites to deploy a probe in other tanks that are to be tested. He may also retrieve probes from other tanks that have been installed for a period of time such as over night. The test information is transferred from each retrieved probe to the field processor in the technician's truck. At the end of the technician's schedule rounds, he connects the field processor to a telephone line via a modem and uploads the information stored in the field processor to a regional area computer at a central location. This regional area computer merely records tests packets from each tested tank as collected from one or more field processors. The regional area computer does not generate any tank leakage information. This computer uploads all of its test packet information to a national centralized report generation (NCRG) computer. The NCRG computer subjects each test packet to an analysis routine which disregards readings associated with sudden drops in fluid levels. These are attributed to be due to normal tank depletion due to pumping. It processes the readings taken during quiet periods where small level changes may be detected between readings. The data is further subjected to a model to determine the behavior of the tank based on an analysis of all pertinent information known. This includes any historical data from previous tests performed on the same tank. These modeling techniques include volume integration calculations, thermal conductance, heat capacities and other expansion coefficient information, tank history information and archival tank mapping trend analysis. This leaves little conjecture when the NCRG computer prepares the final report as to the voidage rate for each tested tank.

The test probe comprises a hollow tube which contains a moveable float assembly in the lower portion of the tube and a probe processor in the upper portion of the tube. The lower portion of the tube is perforated so as it can receive the tank fluid. The float mechanism floats in the fluid stored in the tank. The movement of the float either up or down, is translated by equipment in the upper portion of the float into coded electrical signals representing the current level of tank fluid. These coded signals are applied to an infrared LED (light emitting diode) which is positioned in the upper portion of the float. The coded infrared beam is transmitted upwards within the hollow tube to the probe processor in the upper portion of the hollow tube. This associated equipment includes an infrared detector which receives the coded beam generated by the infrared LED. The prob processor converts the received infrared beam into signals representing the instantaneous value of the tank fluid detected by the float. The probe processor periodically samples and averages the decoded infrared signals which represent the instantaneous fluid level within the tank. The results of each sample are stored in the memory of the probe processor.

The float includes a friction wheel which is vertically oriented so that the axis of the wheel is horizontal and perpendicular to the longitudinal axis of the hollow tube and the float. The friction wheel is rotatable and its periphery is forced against the inner wall of the hollow tube which houses the float. The friction wheel rotates when the float moves up or down. The friction wheel is attached by means of rotational multiplication to a decoder wheel having 500 openings or slots. Each slot extends inwardly radially from the periphery of the decoder wheel towards the center of the wheel. The decoder wheel is positioned intermediate a light generator and a light detector in a suitable manner so that a beam of light generated by the light generator is interrupted periodically as the decoder wheel rotates in response to rotation of the friction wheel. The interrupted light signals generated by the decoder wheel are applied to electronics which generate signals indicative of the tank fluid level. The signals are applied to the aforementioned infrared LED which generates a coded infrared light beam that is projected upward to the probe processor in the upper portion of the hollow tube comprising the probe.

In partial summary, the float moves up and down in response to changes in fluid level. The float processor also filters out any noise due to vibration, wind, etc. The float processor generates a coded infrared beam indicative of tank fluid levels. The probe processor receives and decodes the infrared beam. The probe processor further smooths the raw data received by averaging and variances techniques and stores the result in the probe processor memory as minute logs and second logs.

The technician returns to the test site at the conclusion of the test, retrieves the probe from the fill pipe of the tested tank, and connects the probe to the field processor in the truck. The field processor reads out (uploads) the contents of the probe processor memory including all of the test data accumulated by the probe processor. For security purposes, the field processor also increments a counter within the probe processor so that information is always available indicating the number of times the probe processor and the probe assembly has been used.

The technician then disassembles the probe assembly, stores it in his truck, and moves to another location to test other tanks. The technician may immediately connect the field processor via a telephone line and a modem to a headquarter's regional area computer which receives the test information just retrieved by the technician. Alternatively, the technician may retrieve test data from other probes in other tanks in a manner similar to that just described. Then, at the end of the day when the technician and his truck return to headquarters, the truck's field processor may be connected to the regional area computer and the information representing all of the tests conducted and retrieved by the technician throughout the day may be read out and entered into the regional area computer. This computer then collects data from all such field processors within its region and forwards it to the NCRG (national centralized report generation) computer. The NCRG computer then receives the test data reported by the various test probes, translates the test data into tank leakage information, correlates the tank leakage information with the leakage history of all tanks stored in the computer and generates the required reports. Further, it stores information regarding the leakage history of all tanks.

The disclosed apparatus is advantageous and overcomes a number of disadvantages of the prior art. First of all, the probe is self contained, it is inserted into the tank fill pipe and it is totally underground during the testing of the tank. No apparatus is above ground. This permits the service station of which the tank is a part to continue in operation. This is in distinction to many of the above discussed prior art patents wherein testing apparatus is positioned immediately above the fill pipe. This aspect of the present invention is most advantageous since fill pipes are often situated in the traffic areas of filling stations. The installation of testing apparatus immediately above a fill pipe would take that portion of the filling station out of commercial use for the duration of the test. Further, the tank itself does not need to be out of service as is required by prior arrangements. The present invention allows the tank owner/operator to continue business as normal while testing takes place.

Another advantage of the invention is that it only requires the services of a relatively unskilled operator to install the probe, to remove the probe at the end of the test, and to transfer the test data from the probe processor to the field processor in the technician's truck. The technician's duties do not include the installation or operation of complicated laboratory level equipment with fine subjective adjustment or interpretation of reading as do prior arrangements. Instead, the invention requires only the services of a relatively unskilled operator who performs no chores regarding the operation of the testing equipment or an analysis of the data produced by the test. Also, the operator has no access to the test data that is generated. At the end of the test, he merely removes the test probe from the tank, transfers the data generated during the test from the probe processor to the field processor on his truck in a form only that the computer understands. The technician then subsequently transfers the test data from the field processor to a regional computer and then to a national computer which contains the software required to translate the test data into meaningful results including the generation of leakage information for the tested tank. Since, the field technician does not have access to the generated test data, a high degree of security is provided for the test data and the possibility of fraudulent use or erroneous interpretation of the test data is minimized. For example, since the technician has no access to the test data, there is a reduced possibility of collusion between the technician and any persons who may wish to falsify data to misrepresent the integrity of a tested tank. Or, simply due to human limitations, manual recording and mis-characterization of values of instruments can also misrepresent the integrity of a tested tank. This is in contrast to the various prior art arrangements wherein the tank leakage information is derived and displayed at the tank site. In such arrangements, human frailty can effect the leakage integrity of a tested tank.

It may be from the above that the Applicant's invention provides a new and novel method of testing tanks that overcomes many of the disadvantages of the above discussed prior art arrangements. It is further seen that the apparatus provided to perform the tank testing is compact, is self contained and is below the fill-pipe cap so as to minimize the inconvenience to the service station of which the tested tank is a part. The method and apparatus of the present invention overcomes many of the disadvantages of the above discussed prior art documents and achieve a technical advance in the art.

DESCRIPTION OF THE DRAWING

These and other advantages and features of the invention may be more readily understood from a reading of the following description thereof taken in conjunction with the drawing in which:

FIG. 3 illustrates further details of the lower portion of the float and the hollow probe in which the float is contained;

FIG. 4 illustrates the details of the temperature sensing apparatus of the probe;

FIG. 5 illustrates the float in the bottom portion of the probe and the equipment in the upper portion of the probe with which the float communicates;

FIG. 6 illustrates the equipment attached to the bottom portion of the float;

FIG. 7 illustrates details of the apparatus in the upper portion of the float which detects fluid level displacements and generates electronic signals indicative of such displacements;

FIGS. 8 and 9 disclose further details of the float guide wheels;

FIGS. 11, 12, 13, 14 and 15 disclose further details of the apparatus of FIG. 10;

FIG. 16 discloses the probe processor contained within probe segment 21;

FIG. 17 discloses the probe processor switch and connector looking into the top of probe segment 21;

FIG. 18 discloses the field processor normally stored in the technician's truck;

DETAILED DESCRIPTION

Figure 1:
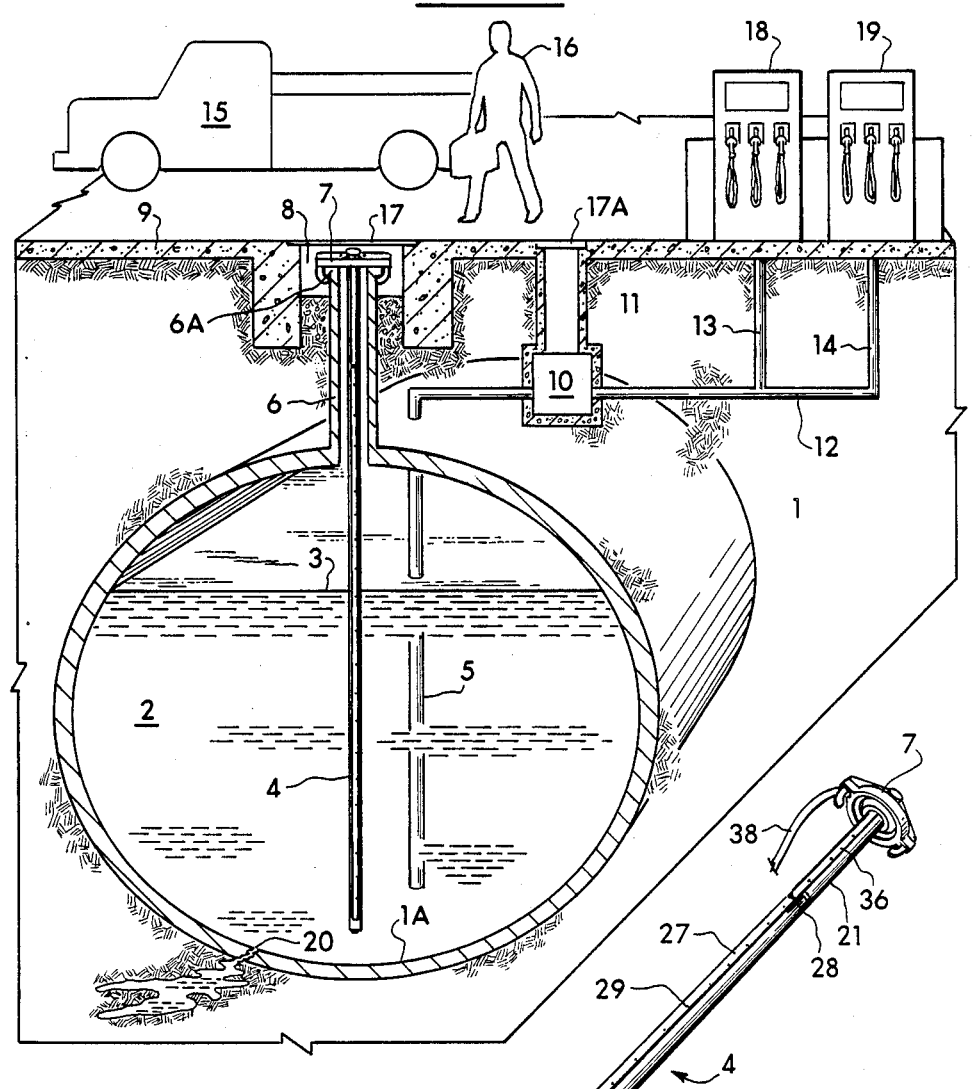
FIG. 1 sets forth, in perspective illustration, a fuel tank and associated plumbing being tested by apparatus comprising one possible illustrative embodiment of the present invention.

FIG. 1 discloses apparatus comprising one possible illustrative embodiment of the present invention being used to test an underground fuel storage tank. The tank being tested is shown as comprising a part of a gasoline filling station. Shown on FIG. 1 are an underground tank 1 filled to a level 3 with a liquid 2. Further shown on FIG. 1 is a test probe assembly 4 together with a pipe 5 which permits the filling station users to withdraw fluid 2 from the tank 1. Pipe 5 extends upwards and out of tank 1 to a pump 10 located in a chamber 11 having a top 17A. Fluid 2 is moved by pump 10 through pipe segments 12, 13, and 14 to fuel dispensers 18 and 19.

Probe assembly 4 is inserted by technician 16 into the fill pipe 6 of tank 1. The top of the probe 4 is attached to fill pipe cap 7 which is positioned in an underground chamber 8 having an access fill pipe cover 17. FIG. 1 shows the probe 4 already installed in the tank by technician 16. Truck 15 is used by technician 16 to transport the test probe 4 and other associated test equipment from location to location. FIG. 1 also shows the bottom of tank 1 having a small crack 20 through which fuel 2 may escape from the inside of the tank to the outside environment (or through which water from the ground may flow in).

It should be noticed in connection with FIG. 1, that the entirety of the test apparatus of the present invention is contained within probe 4 and that this apparatus is unobtrusive and below the top surface the concrete slab 9 of the filling station. Since the probe is underground, it permits the tank to be tested in a manner that does not interfere with normal operation of the filling station of which the tank is a part. It also does not require laboratory level technicians to operate the equipment.

DESCRIPTION OF FIG. 2

Figure 2:
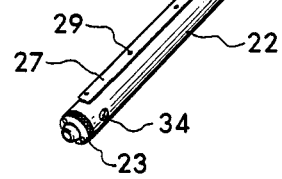
FIG. 2 illustrates the probe of the present invention.

FIG. 2 discloses further details of probe 4 of FIG. 1. The probe comprises an upper segment 21 which is attached to the bottom of fill cap 7. The probe 4 further comprises a lower segment 22. Attached to the bottom portion of probe segment 22 is a bottom cap 23 which, as shown on FIG. 3, has a knurled portion 24, drain holes 25, and a conical shaped bumper member 26. The probe 4 further comprises a tape or strip 27 having a plurality of temperature detecting elements (such as every eight inches) shown as dots 29 on FIG. 2 atop the strip 27. Elements 29 are each connected by separate conductors to a probe processor within segment 21 which records the temperature of the tank fluid at different levels as well as the temperature of the vapor above the tank fluid at different levels.

In operation and in accordance with the teachings of the present invention, the technician 16 measures the depth of the fluid 2 within tank 1 at the test site by the conventional dip stick method, not shown in the drawing. That is, distance between the tank bottom 1A and the fluid surface 3, as well as the distance between the tank bottom 1A and the top 6A of fill pipe 6. These dimensions are entered into the field processor 108 (FIG. 19) wherein the field processor recommends the appropriate length probe 4 to use in testing tank 1. This process also eliminates the possibility of testing an empty tank. It should be noted that although this function is a human judgment with respect to levels, it is in no way a factor in the determination of whether the tank is leaking. After selecting the appropriate length probe 4 which is stored in truck 15, the technician 16 assembles the apparatus by first activating the float processor 59 (FIG. 7) and inserting the float 30 into the hollow inner portion of the probe member 22 through the bottom as shown in FIG. 3. A plug 23 is then attached to the bottom portion of probe segment 22 to captivate the movable float 30 within the hollow chamber of segment 22.

Next, technician 16 connects a conventional RS232 communications type cable (not shown) between the probe processor 48 which is housed within the upper segment 21 via connection 107. The field processor 108 prompts the technician to activate the probe processor 48 by positioning switch 106 to ON as shown in FIG. 17.

The field processor 108 initializes the probe processor 48 to do a self diagnostic routine which includes all aspects of operation such as battery life, memory, temperature sensors, and communication. The float processor has already been activated as previously described. If all functions are okay as determined by the field processor 108, the technician 16 is prompted to disconnect the RS232 communications cable and install the probe 4 in tank 1. He next affixes probe 4 and its upper segment 21 to the bottom of fill cap 7. Fill cap 7 is selected at various tank sites to fit a variety of fill pipe 6 sizes. In this manner, the probe 4 can easily accommodate any tank. The probe is installed into the tank 1 by inserting the properly activated probe 4 in fill pipe 6 until the bottom of the fill cap 7 rest on the top 6A of fill pipe 6. A lock may be conventionally installed on the test probe 4 fill pipe cap 7 in the same manner as would be installed on any conventional fill pipe cap. The fill pipe manhole cover 17 is put back in place and the technician 16 has completed this portion of the tank testing operation and is free to leave the test site.

The probe 4 contains a movable float element 30 (shown on FIGS. 3 and 5) which is contained within the hollow inner portion of the probe member 22. The float 30 is inserted into the bottom portion of lower probe segment 22 and is captivated within by the bottom plug 23 to the bottom portion of probe segment 22. Drain holes 25 and 34 (FIG. 3) in segment 22 permit the tank fluid 2 to enter and fill the inside of the probe assembly 4. Float element 30 (FIGS. 3 and 5) floats in the fluid 2 inside the hollow segment 22 to the exact up or down movement of float element 30 with changes in tank fluid levels and permits the probe to determine the tank fluid level at any time during the test.

The knurled portion 24 of bottom plug 23 (FIG. 3) facilitates assembly and disassembly of the probe assembly. Float element 30 contains apparatus for generating signals indicating the fluid level in the tank at all times during the test. These signals are transmitted upwards within probe 4 by means of an infrared beam 44 to a probe processor in the upper segment 21 of the probe. The probe processor responds to the infrared signals, samples the signals periodically and stores information pertaining to each sample within a memory element associated with the probe processor.

Petroleum based fluids are subject to considerable expansion and contraction as the temperature of the fluid varies. These contractions and expansions result in changes in fluid level of a degree that can equal or exceed the differences in fluid levels caused by small tank leakages. Therefore, it is necessary that the tank fluid temperature be sensed at all times and that fluid temperature information be supplied to the probe processor which also determines the tank fluid level from the received infrared signals.

FIG. 2 illustrates elongated strip 27 which extends downwardly along the fiberglass probe segment 22. Strip 27 is attached to the probe segment 22 by means of a suitable bonding material, such as fiberglass and epoxy. Strip 27 includes a plurality of temperature sensing elements 29 (such as every eight inches). The probe processor, continuously receives and records this information from elements 29 together with the fluid height information received from the infrared beam 44 generated by the float. The probe processor records the tank fluid level information and also records the fluid level temperatures generated by the various devices 29. In addition, a pressure sensor resides on the probe electronics processor printed circuit board 48 inside the upper probe segment 21 and is common to atmosphere within the tank 1 and fill pipe 6. This indicates to the probe processor 48 the barometric pressure. These values are recorded along with the above mentioned level and temperature values. In the present embodiment, the probe processor does not perform the calculations that would be required to integrate the fluid temperature and barometric pressure information with the fluid level information so as to generate meaningful information indicating the extent to which the tank may be leaking. Instead, the probe processor merely records the temperature barometric pressure and fluid level parameters for each reading and makes this recorded information available to a field processor in the technician's truck at the end of the test interval.

DESCRIPTION OF FIG. 3

FIG. 3 discloses the bottom portion of probe segment 22 together with a portion of float 30 which is contained within the interior of probe segment 22. The technician inserts float 30 into the hollow segment 22 at the beginning of a test and then attaches bottom plug 23 to the bottom portion of segment 22 by means of threads 37 on plug 23 and cooperating female threads on the bottom end of element 22.

Attached to the bottom portion of float 30 is tubular member 31 having spring 32 affixed to its bottom end. Spring 32 isolates probe 30 from shocks that otherwise might be encountered if element 31 would hit the bottom inner portion of plug 23. This could occur when the probe is first positioned in a vertical position prior to inserting it into the fill pipe 6 of the tank to initiate a test.

Affixed to tubular member 31 are three wheels 35 which are positioned circumferentially approximately 120 degrees from each other with respect to the longitudinal axis of the member 31. Wheels 35 are spring loaded and bear against the inner wall of probe segment 22 when float 30 is fully inserted within segment 22. Wheels 35 center float 30 within the inner portion of segment 22 in such a manner that float 30 does not rub against the inner surface of segment 22. Wheels 35 and similarly arranged wheels 39 (shown on FIGS. 5 and 7) on the top portion of float 30, keep float 30 freely movable within the inner portion of hollow element of probe segment 22. Float 30 is hollow and it is free to float up or down within the hollow probe segment 22 in the tank liquid at the exact level of the tank liquid. The height of float 30 within the liquid at any time is indicative of the current fluid level within the tank. In FIG. 5, fluid level 3 shows where float 30 sets in the liquid. This relationship may be higher or lower depending on the specific gravity of the fluid being tested.

Bottom plug 23 has holes 25 in its bottom surface. Holes 25 permit tank fluid to drain from probe segment 22 at the end of a test when probe 4 is removed by the technician from the tank. Hole 34 in the lower portion of segment 22 also facilitates the removal of any tank fluid from the probe at this time.

DESCRIPTION OF FIG. 4

FIG. 4 discloses further details of strip 27 and its temperature sensing elements 29. FIG. 4 illustrates three separate portions of segment 22. The upper portion of strip 27 emerges from an opening 28 in the upper portion of probe segment 22 and extends downwardly along the outer periphery of the probe to the bottom portion as shown on FIG. 2. Strip 27 contains a plurality of separate electrical conductors 40 together with a plurality of temperature sensing elements 29. Each temperature sensing element 29 has two terminals which are connected to a different pair of the conductors 40. Strip 27 includes an outer coating 45 which is applied to the strip after the temperature sensing elements 29 are attached to the various conductors 40. The conductors 40 and temperature sensing elements 29 are then encapsulated by coating material so as to protect the conductors 40 and elements 29 from the corrosive effects of the tank fluid. The strip 27 is affixed to the probe assembly by means of a suitable bonding material such as for example, epoxy cement and fiberglass cloth.

Strip 27 enters opening 28 at its upper end and within segment 22 is connected to processor within segment 21 which derives temperature information for each of elements 29. A second temperature strip 36 also extends out of opening 28 and extends upward along element 21 (see FIG. 2), through the fill cap 7 where it is connected to a probe 38 which can be inserted into the soil of chamber 8 to measure the soil temperature. Strip 36 also includes temperatures sensing elements 29 for sensing the temperature of the vapors above the fluid within the fill pipe 6.

FIG. 5 illustrates the major components comprising probe 4 together with the manner in which these components interact to monitor the fluid level in the tank in which probe 4 is inserted. As can be seen from FIG. 5, probe 4 includes a fill pipe cap 7 on its top portion and an upper probe segment 21 whose top end receives the threaded portion of the fill pipe cap 7. Probe 4 further includes a lower probe segment 22 and a bottom plug 23 having a rubber bumper 26 and a knurled portion 24. Threads 37 of the plug 23 permit the plug to be screwed into mating female threads on the bottom portion of lower probe segment 22.

Probe segments 21 and 22 are hollow and probe segment 22 contains the float 30 which was inserted into the bottom of segment 22 by the technician prior to screwing bottom plug 23 into the bottom of probe segment 22. Tubular member 31 is attached to the bottom of float 30 and wheels 35 are attached to the outer surface of tubular member 31. Spring 32 on the bottom of member 31 cushions the float 30 in the event that it should drop suddenly against the bottom of plug 23. Wheels 35 bear against the inner surface of probe segment 22 and keep float 30 centered and away from the inner walls of segment 22. Tubular member 52 is attached to the upper portion of float 30 and wheels 39, which are similar to wheels 35, are attached to the outer surface of member 52. Wheels 39 and 35 work in combination to keep the float centered within and away from the inner walls of lower probe segment 22 while at the same time permitting the float 30 freely to move up and down as the tank fluid level changes.

Attached to the top of tubular member 52 is the apparatus generally designated as 41 which continuously generates information indicating the height of the fluid in which float 30 is suspended. The details of apparatus 41 are subsequently described in connection with FIGS. 7 and 10. The output information from apparatus 41 is applied to float processor 59 shown in connection with FIG. 7 which generates signals that are applied to the infrared light emitting diode (LED) 43. LED 43 generates a coded infrared beam 44 which is transmitted upwards within probe segment 22 to the infrared photo detector 47 shown within springs 46. The output of photo detector 47 is extended upwards and over conductors 53 to the probe processor generally designated as 48 in FIG. 5. Processor 48 is shown as being contained within upper probe segment 21.

It may be seen from the above that float 30 moves up or down, as the case may be, in response to corresponding changes in the level of the tank fluid in which probe 4 is suspended. The apparatus 41 detects each movement of float 30 in response to each change in fluid level and generates a continuous signal at all times indicating the tank fluid level. Since the output of apparatus 41 is connected by associated electronic equipment to the infrared LED 43, LED 43 generates and projects upward a coded infrared beam containing information specifying the instantaneous value of the tank fluid level measured by apparatus 41.

The coded infrared beam is received by photo detector 47, passed over conductors 53 to the probe processor 48 which continuously samples the fluid level information received via the infrared light beam. The sampled fluid level information is temporarily stored in a scratch pad memory of the processor. The processor analyzes the stored information to produce tank fluid level information that is usable for subsequent processing operations. For example, the processor disregards information associated with sudden drops in tank fluid level since these are assumed to be due to normal depletion and not to tank leakage. Also, the processor disregards ten percent of the readings representing the lowest fluid level and ten percent of the readings representing the highest level. It then averages out the remainder of the readings to generate a resultant figure representing the tank fluid level for a given interval of time such as for example every second. In other words, once every second the processor generates a figure that represents the average level of the fluid within the tank for the one second interval. This one second fluid level reading is then stored in a semi-permanent area of the processor's memory and remains there until a 30 second mark occurs. Every 30 seconds, a least squared algorithm is applied to the previous 29 second values. The resultant slope along with the 30 second level value, 16 temperature values from elements 29, and the barometric pressure value are stored in a permanent area of processor memory to remain there until the information is read out by the technician's field processor.

The operation continues in this manner for the duration of the test with the probe processor 48 generating fluid level, multiple temperature and barometric pressure data points and storing this information for subsequent readout in the semi-permanent memory of the probe processor. Finally, the technician returns to the site of the test at the end of the test and lifts the entire probe assembly 4 as shown on FIG. 5 out of the tank. He unscrews the fill pipe cap 7 from probe segment 21 in order to gain access to the switch 106 and the connector 107. He then connects a field processor on his truck, as subsequently described, to the connector 107 and operates the field processor to cause the contents of the memory of probe processor 48 to be transferred from the probe processor to his field processor. The information regarding the results of the test is then stored in the field processor and made available for subsequent transportation back to the NCRG computers.

The "test packets" (logs) are transported back to the NCRG center for further processing. As each log is received, the raw digital values are converted to physical units (e.g., degrees Fahrenheit) and then passed onto a mathematical model along with other parameters. Incorporated within the embodiment of this application are means for precise fluid level, temperature and ambient pressure recording; means for on-probe preprocessing of the digital signal; means for transporting logged sensor readings; means for mathematical simulation of a non leaking tank, and finally means for expression of the test results. Test results are generated reporting statistical history of the tank and then graphically displaying logs and model output over time. These graphs include: (1) fluid level temperature and pressure data points, (2) uncompensated and compensated tank volumes, and (3) uncompensated and compensated voidage rates, and finally voidage rate in gallons/hour with a specified "confidence interval" as a percentage from 1 to 100.

The information that is generated and stored by the probe processor 48 includes not only the tank fluid level information but also the temperature information at various levels of the fluid. This information is generated by various elements 29 of strips 27 and 36 which have been described in detail in connection with FIG. 4 and therefore are shown only generally in connection with FIG. 5. Strip 27 and its associated elements 29 generates the temperature information for the lower portion of probe 4. Strip 36 and its associated elements 29 generate the temperature information for the upper portion of the probe. The opening 28 and the lower hole 34 in element 22 (FIG. 3) together with the holes 25 in plug 23 permit the tank fluid to enter the probe assembly 4 when the probe is first inserted into the tank. These holes and openings also permit a change in the level of the tank fluid to reflect a corresponding change of the fluid within the inside of probe 4. Thus, float 30 responds to all changes in tank fluid level so that the level of float 30, and the coded infrared information transmitted upwards in light beam 44, at all times reflects the instantaneous level of the fluid within the tank. These holes and openings also permit the fluid to drain readily from the inside of probe 4 when it is removed from the tank at the end of the test.

The technician disassembles the probe by unscrewing lower plug 23, removing float 30 from the bottom of the probe. The various elements comprising the probe are then stored on the truck by the technician following the disassembly of the probe 4. Following the disassembly of probe 4 and the reading out of the information from the probe processor 48 into the field processor stored on the truck, the technician is free to proceed with the testing of other tanks, either at the same location or at another location.

DESCRIPTION OF FIGS. 5, 6 AND 7

FIGS. 5, 6 and 7 disclose further details of the float 30, the apparatus connected to the bottom of float 30 and the apparatus connected to the top of float 30. FIG. 6 discloses a bottom segment of float 30 together with further details of the apparatus connected to this portion of float 30. As can be seen on FIG. 6, the tubular member 31 is connected to the bottom portion of float 30 by means of threads 56 on the upper portion of member 31 and by means of cooperating female threads (not shown) in the lower portion of float 30. Three guide wheels 35 are mounted to tubular member 31 as generally indicated on FIG. 6 and as described in detail on subsequent figures. The purpose of these three wheels is to center float 30 within the inner confines of probe tube 22 while at the same time preventing float 30 from contacting or rubbing against the inner wall of probe segment 22. The wheels 35 are low friction devices made for example of Teflon and freely permit the float 30 to move up or down in response to changes in tank fluid level.

Springs 32 are mounted on fixture 54 which in turn is affixed to the lower portion of tubular member 31 by means of threads 64 and cooperating female threads (not shown) in the bottom of tubular member 31. The function of springs 32 is to cushion float 30 and the apparatus connected thereto from the shocks that might otherwise be encountered in the event that the bottom of tubular member 31 and float 30 should move downward suddenly and bump up against the bottom inner portion of lower cap member 23.

FIG. 7 shows the top of float 30 in segmented form together with further details of the apparatus connected to the top portion of float 30. The function of the apparatus mounted on the top of float 30 is to detect changes in tank fluid level, to generate information indicating the current level of the tank fluid and to generate a coded infrared signal that is transmitted upwardly within lower probe segment 22 indicating the current level of the fluid within the tank being tested. The apparatus that detects changes in fluid level is generally designated as 41 on FIG. 5. On FIG. 7, this apparatus includes a friction wheel 60, a code wheel 57, and a pick-up transducer 56. Apparatus 41 is mounted to the top of a tubular member 52 with the bottom portion of tubular member 52 being affixed to a threaded member 67. The threaded member 67 is cooperates with female threads (not shown) on the top inside portion of float 30. The two guide wheels 39, shown on FIG. 7, serve both the same function as do the lower guide wheels 35. They also position the float 30 so as to insure continuous contact of the friction wheel 60 with the inner wall of the probe 22. Wheels 39 are mounted to tubular member 52 by means of apparatus that is discussed in detail subsequently.

Apparatus 41 includes a friction wheel 60 whose outer periphery bears against the inner wall of probe tube 22 and maintains continues contact aided by the wheels 39. Wheel 60 is rotated in response to vertical movements of float 30 and the rotation of wheel 60 causes a rotation of code wheel 57. Code wheel 57 contains a plurality (500) of radial slots or openings, in the preferred embodiment, in its outer periphery and the outer portion of code wheel 57 is positioned within the lower U-shaped opening of transducer 56. Code wheel 57 and transducer 56 are conventionally available from Hewlett-Packard Corporation, 370 West Trimble Road, San Jose, Calif. 95131 as part numbers HEDS-5100-A03 and HEDS-9100-A00 respectively. Transducer 56 contains a light source and a light detector positioned on opposite sides of the code wheel 57. The slots within code wheel 57 alternately enable and break the light beam generated by the light source and received by the photo detector. These interruptions are detected by the photo detector, converted to the appropriate electrical signals by transducer 56 and applied out over conductors 53, through the inner portion of tube 58 downward through the lower inside portion of threaded element 67. These electrical signals are applied to float processor 59 which process these signals and generate an output signal which is applied by means of conductors 61 of tube 58 to the infrared light emitting diode (LED) 43 which is positioned within the top portion of cone 42. The electronics apparatus 59 applies coded signals to the infrared (LED) 43 indicating the current instantaneous level of the tank fluid in which float 30 is floating. Cone 42 is mounted to the outer walls 68 of apparatus 41 by means of screws 66. Its cone shape is important to shed condensation which may result from the vapors above the fluid in which float 30 is floating. Condensation droplets may add weight to the float and thus the float would ride lower in the fluid and give error to the fluid level value.

In summary with regard to the apparatus shown in FIGS. 5, 6 and 7, the function of this apparatus is to keep the float 30 centered within probe segment 22, detect the instantaneous level of the tank fluid in which float 30 is suspended to generate signals indicating the tank fluid level, and to generate a coded infrared beam which contains information representing the instantaneous value of the level of the tank fluid. Friction wheel 60 engages the inner wall of probe segment 22 and is rotated in response to vertical displacements of float 30. Each rotation of wheel 60 causes a rotation of code wheel 57 which, in turn, causes the electric signals to be generated that specify the instantaneous level of the tank fluid. The electronics equipment 59 is affixed by means of a bracket 63 to a bracket 62 and is totally contained within the inside of float 30 when threaded member 67 is threaded into the female threads in the upper portion of float 30.

DESCRIPTION OF FIG. 10

Figure 10:
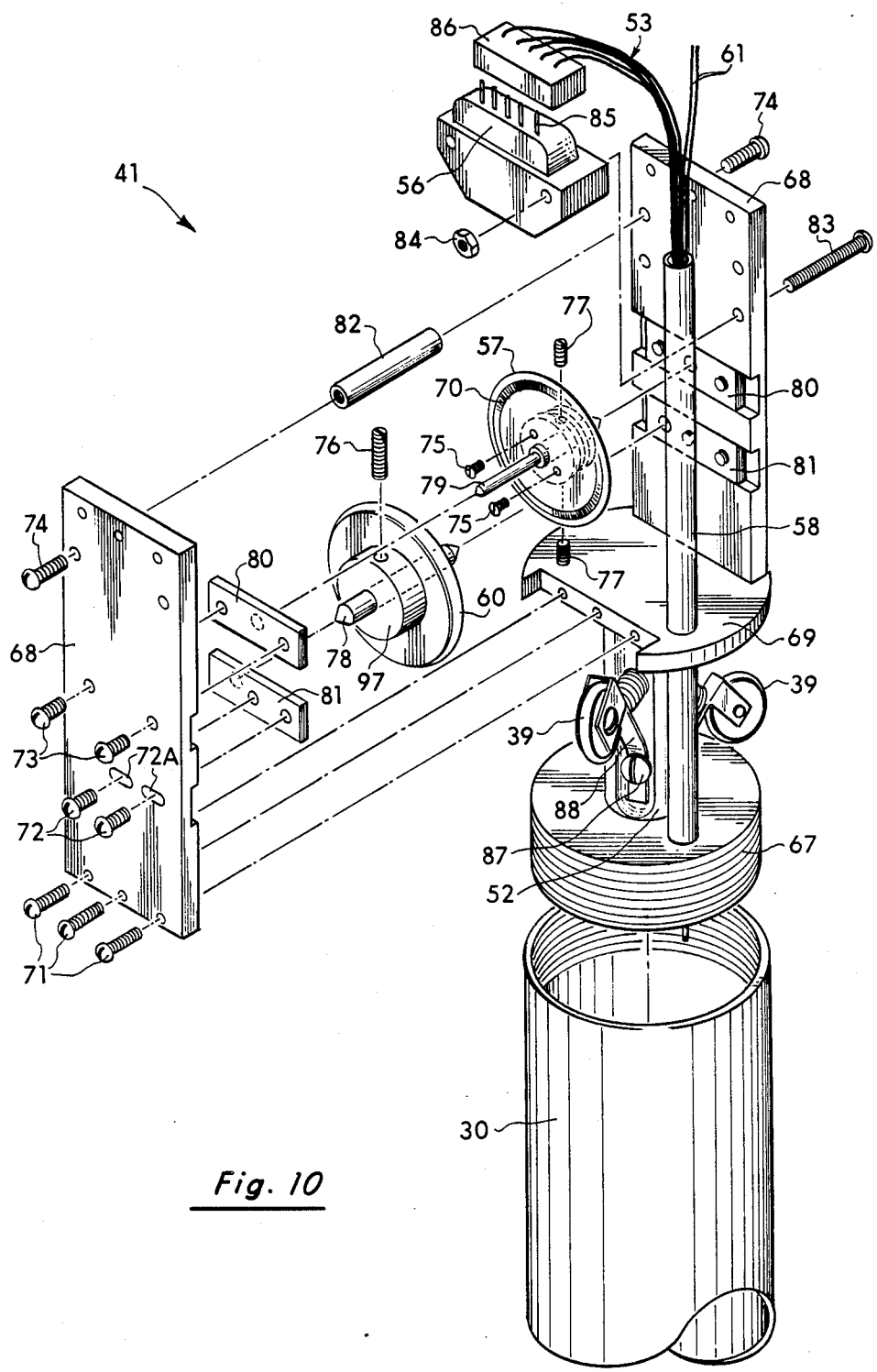
FIG. 10 discloses further details of the code wheels and associated apparatus which generate signals indicative of changes in fluid level.

FIG. 10 discloses further details of the apparatus 41 comprising the friction wheel 60 and the code wheel 57. Apparatus 41 includes a circular base member 69 having two cut-out portions for receiving the bottom portion of vertical walls 68. The left wall 68 on FIG. 10 is mounted to the cut-out portion of base 68 by means of the three screws 71. The right wall 68 is mounted to base member 69 in a similar manner. A jeweled bearing plate 81 is affixed by means of screws 72 to the inner portion of each wall 68. Similarly, a jeweled bearing plate 80 is affixed by means of screws 73 to the inner surface of each of wall 68.

Friction wheel 60 has a shaft 78 and the ends of shaft 78 are mounted within jeweled bearings in plates 81. Similarly, code wheel 57 has a shaft 79 with the ends of shaft 79 being mounted in jeweled bearings in plate 80. Elongated holes 72A allow plates 81 to be positioned such to correct any machining tolerances during manufacturing so as to adjust the minimum amount of tension between the friction wheel 60 and code wheel shaft 79.

Spacers such as spacer 82, are mounted by screws 74 to walls 68 so as to keep the two walls 68 the proper distance from each other. The pick-up head 56 is mounted against the right wall 68 by means of screws 83 and nuts 84. As shown on FIG. 7, pick-up head 56 has a bottom U-shaped opening into which the outer portion of code wheel 57 is positioned. The code wheel 57 has radial slots or openings 70 circumferentially arranged and pick-up head 56 includes a light source and a light detector which cooperate with the slots 70 and code wheel 57 to generate tank fluid level information.

The circumference of wheel 60 bears against the inner wall of probe tube segment 22 and wheel 60 is rotated in response to each up and down motion of float 30. A rotation of wheel 60 rotates wheel 57 since the circumference of wheel 60 bears against shaft 79 which acts like a pulley to amplify the motions of wheel 60 by a factor corresponding to the corresponding diameters of shaft 79 and wheel 60. As a consequence, code wheel 57 is rotated in response to each rotary movement of wheel 60 and the rotation of wheel 57 causes its slots 70 to alternately interrupt and enable the light beam generated by pick-up mechanism 56. The output signals from pick-up mechanism 56 are applied over the five pins 85 which are inserted into corresponding sockets of plug 86 which is connected to wires 53. Thus, the output signals from pick-up head 56 are applied over conductors 53 extend downwardly through tube 58 and through threaded element 67. The lower end of these wires is connected to the float processor circuitry 59 shown on FIG. 7 by connectors 62 and 63. Processor 59 is connected to the bottom part of threaded element 67 and is totally contained within float 30 when threaded element 67 is screwed into the female threads in the upper portion of float 30. Set screws 76 and 77 affix wheels 60 and 57 respectively to shafts 78 and 79 respectively. Retainer screws 75 hold wheel 57 on drum 98.

The three wheels 39 are connected to the tubular member 52 by means of the indicated apparatus shown on FIG. 10. This apparatus includes a flat spring member 88 having an outer end to which each wheel 39 is connected. The inner or lower portion of each of flat spring member 88 is connected by means of a screw 87 to the outer wall of tubular member 52. The subsequent figures show further details of the apparatus and hardware used to mount wheels 39 and wheels 35.

DESCRIPTION OF FIGS. 8 AND 9

FIG. 8 comprises a cross-sectional view taken along line 8—8 of FIG. 6 and looking upwards from line 8—8. Shown on FIG. 8, is the bottom of float 30 contained within the wall 22 of the lower section of probe element 22. Float 30 is kept away from and centered within the inner confines of probe segment 22 by the three wheels 35 which are spaced approximately 120 degrees from each other. The three wheels 35 are mounted by the springs 88 and means of the indicated screws to a cutout in tubular element 31 which is attached to the lower end of float element 30. As seen on FIG. 8, the three wheels 35 keep the float 30 centered within the probe element 22 while at the same time permitting the float element 30 to easily move up and down as the case may be as the tank fluid level changes.

FIG. 9 comprises a cross-sectional view taken along line 9—9 of FIG. 7 and looking upwards from line 9—9. Shown on FIG. 9 are the two wheels 39 which are attached by means of the indicated spring members 88 to the upper tubular element 52. The lower end of element 52 is attached to threaded element 67 (FIG. 7) which, in turn, screws into the upper end of float 30.

In a manner analogous to that of FIG. 8, wheels 39 keep the float element 30 centered within and away from the inner walls of probe element 22 while keeping continuous pressure on the friction wheel 60 by means of the spring 88. These two wheels 39 assure contact of the friction wheel 60 to the inner wall of probe element 22. At the same time, the wheels 39 permit the float element 30 to easily move up or down when changes occur in the level of the tank fluid.

DESCRIPTION OF FIGS. 11 AND 12

FIGS. 11 and 12 disclose the apparatus used to mount wheels 35. On FIG. 11 this apparatus is shown as comprising a flat spring 88 together with a wheel frame 89. The wheel frame 89 is shown on FIG. 11 in its unbent form. In its fabrication, the wheel frame 89 is bent by 90 degrees downward in the area of each of the indicated dotted lines. The resultant configuration of element 89 is shown in FIG. 12 where it comprises an inverted U-shaped form with the one end of spring element 88 being affixed to the upper portion of element 89 by any suitable means such as spot welding. Wheel 35 comprises a wheel frame 95 made of Teflon and a tire 94 mounted in the circumferential grooves of wheel frame 95. The wheel frame 95 has a center hole to receive a bolt 92. The wheel 35 is mounted and contained within the U-shaped portion of element 89 by aligning the hole in wheel frame 92 with the holes 91 in element 89 and then by inserting the bolt 92 through the first hole 91, through the hole in the wheel frame 95 and then through the second hole 91 of element 89. Bolt 92 is held in place by the snap ring 93.

After being fabricated in the manner shown in FIG. 12, the outer end of the spring member 88 is bent slightly as shown in FIG. 10 and the hole 96 of spring member 88 permits spring member 88 to be affixed to the tubular element 52 as shown in FIG. 10. The wheels 39 as shown in FIGS. 10, 9 and 7 are mounted by similar apparatus to that shown in FIGS. 8, 6 and 3 for wheels 35.

DESCRIPTION OF FIGS. 13, 14, AND 15

FIG. 13 discloses the apparatus used to mount the shafts 78 and 79. As can be seen on FIG. 13, this apparatus includes a left wall element 68 of the wheel assembly 41, a right wall element 68, an upper bearing plate 80 in each wall 68 and a lower bearing plate element 81 in each wall 68. The ends of axle 78 are mounted in jeweled bearing surfaces of bearing plates 81 while the ends of axle 79 are mounted in jeweled bearings in bearing plates 80. The friction wheel 60 is mounted on shaft 78 as shown on FIG. 10. Wheel 60 is rigidly affixed to shaft 78 by means of set screw 76. The code wheel 57 is mounted on shaft 79 and is affixed to the wider left hand portion of shaft 79 as shown on FIG. 13 by set screw 77.

FIG. 14 discloses further details of the apparatus associated with shafts 78 and 79 of FIG. 13. FIG. 14 also comprises a cross-sectional view taken along lines 14—14 of FIG. 7. FIG. 14 shows the shafts 78 and 79 having their ends mounted in the jeweled bearing surfaces in a left wall element 68 and in a right wall element 68. FIG. 14 further shows how wheel 60 and its drum 97 is mounted on shaft 78. FIG. 14 also shows in detail how code wheel 69 and its drum 98 are mounted on shaft 79. The rotation of friction wheel 60 in response to the up and down motions of float 30 causes shaft 79 and code wheel 57 to rotate since the circumference of friction wheel 60 bears against the thin portion of shaft 79 so that a rotation of wheel 60 causes an amplified rotation of shaft 79 and code wheel 69. FIG. 14 also shows the two centering wheels 39 which through the spring 88 causes the float 30 to make continuous contact of the friction wheel 60 with the inner wall of the probe element 22 as well as a cross-sectional view of tube 58 containing the wires 61 and 53.

FIG. 15 comprises a cross-sectional view taken along lines 15—15 of FIG. 7 and shows how the wheel assembly 41 operates when positioned within the inside of probe element 22. Shown on FIG. 15 is element 69 upon which is mounted the vertical wall element 68. Wall element 68 receives one end of shafts 78 and 79 with wheel 60 being mounted on shaft 78 and with wheel 69 being mounted on shaft 79. The circumference of wheel 60 bears upon the inner wall of probe element 22 and also bears upon the axle 79. Thus, when wheel 60 rotates as the float moves vertically, an amplified rotation of shaft 79 and wheel 69 results. The upper portion of wheel 57 is positioned within an opening in pick-up element 56 and the slots or cut-outs 70 in wheel 57 causes sequential interruptions of a light beam within pick-up element 56. These signals resulting from these interruptions are applied to the pins 85 of pick-up element 56. Pick-up element 56 is mounted by nut 84 and bolt 83 to wall element 68. The signals on pins 85 of pick-up element 56 are extended through cooperating female pins and plug 86 and over the five wires 53 to the electronics facilities 59 which, as shown on FIG. 7, are attached to the bottom portion of threaded element 67 and which are contained within the inner top portion of float element 30 when the threaded element 67 is screwed into cooperating three female threads in the upper portion of float element 30. The wires 53 on FIG. 10 are shown as extending downwardly within a tube 58 through the wheel assembly 41 and through the threaded element 67 upon which is mounted the wheel assembly 41. The electronics facilities 59 which are attached to the lower portion of threaded element 67 are shown on FIG. 7 but are not on FIG. 10 for purposes of clarity.

The precision of the float device 30 is effected by two phenomena, hysteresis and damping. Hysteresis is defined as the "dead zone" within which changes in fluid level are not registered by movement of the float. This is caused entirely by friction and angular momentum i.e., friction of the wheel 60 against the tube 22 inner wall and angular momentum of the rotating assemblies, friction of the bearings and other movements. Due to the lightweight material used, the jeweled movements and specialized TEFLON compounds used in the assembly, hysteresis of the float is minimized. In addition, the float is precision engineered to be nearly critically clamped when offset from equilibrium. This is due to an exact volume displacement to weight ratio, allowing the float to come to equilibrium within three oscillations. The described float has low hysteresis and achieves a resolution greater than one ten thousandth of an inch (0.0001 inch).

DESCRIPTION OF FIG. 16

FIG. 16 discloses further details of the upper portion of the probe assembly together with further details of how the probe processor 48 is affixed to and mounted to this upper portion of the probe assembly. The upper portion of probe segment 21 receives the lower threaded portion of the fill cap 7. The probe processor 48 is inserted from the bottom into segment 21 with the bottom section of segment 21 having female threads (not shown) which screw into the threaded element 102 at the bottom of probe processor 48. A suitable O-ring or gasket affixed to the upper portion of ridge 104 forms an explosion tight seal for the probe processor 48 within probe segment 21. Below ridge 104, the inner portion of cylindrical surface 103 receives bracket 101 which onto its bottom portion is mounted a horizontal plate 99. This plate receives, by means of a force fit, the infrared photo detector 47 and mounts the upper portion of spring 46. Spring 46 prevents the float 30 and the upper cone 42 from crashing into the photo detector 47 while probe 4 is being handled during deployment or if fluid level should rise such to cause float 30 to rise and force cone 42 against photo detector 47. Suitable wires interconnect the infrared photo detector with the probe processor 48. These wires are indicated as dotted lines on FIG. 16 and which extend through cylindrical element 103 and the threaded element 102. As priorly mentioned, the photo detector 47 receives the coded signals transmitted upwards from the infrared LED 43 with the digital signals representing fluid level within the tank. Infrared photo detector 47 and infrared light emitting diode 43 are conventionally available from TRW Optron Electronics of Dallas, Tex. as part numbers OP913 and OP295 respectively. The cylindrical surface 103 is inserted into the upper portion of probe segment 22 and is affixed to probe segment 22 by means of screw 105. The opening 28 receives the upper temperature sensing strip 36 and the lower temperature sensing strip 27 to mate connector 101B with connector 101A whose wires are indicated as dotted lines on FIG. 16 and which extend through cylindrical element 103 and the threaded element 102 and connect with the probe processor 48. The conductors associated with the temperature sensing element 29 on these two strips are thereby connected to the probe processor 48 so that the probe processor may include in the data it generates the complete stratification of temperatures of the tank fluid as well as the vapor above the fluid. Stratified temperatures of the complete length of the probe assembly includes: the fluid, the vapor in the fill pipe and the earth surrounding the surface above the tank at the fill pipe manhole 8.

DESCRIPTION OF FIG. 17

FIG. 17 comprises a view of the upper portion of the probe processor 48 after it is extended into the probe segment 21 and prior to the time that the fill cap 7 is screwed into the upper portion of probe segment 21. As shown on FIG. 17, a switch 106 is provided to activate the probe processor by turning it from off to an on position. The plug 107 is provided to permit an interconnection between the probe processor and the field processor mounted in the technician's truck. These connections provided by plug 107 permit the technician to activate and initialize the probe processor at the beginning of a test as well as to transfer the data collected during a test from the memory of the probe processor to the portable field processor.

DESCRIPTION OF FIGS. 18, 19 AND 20

FIG. 18 shows the field processor which is connectable with the probe processor 48. This connection is established by means of a cable that runs from the field processor of FIG. 18 to plug 107 of the probe processor. The field processor is generally designated as one element 108 and is mounted within a suitable carrying case 109 and further includes handles 110 as shown on FIG. 18.

Figure 19:
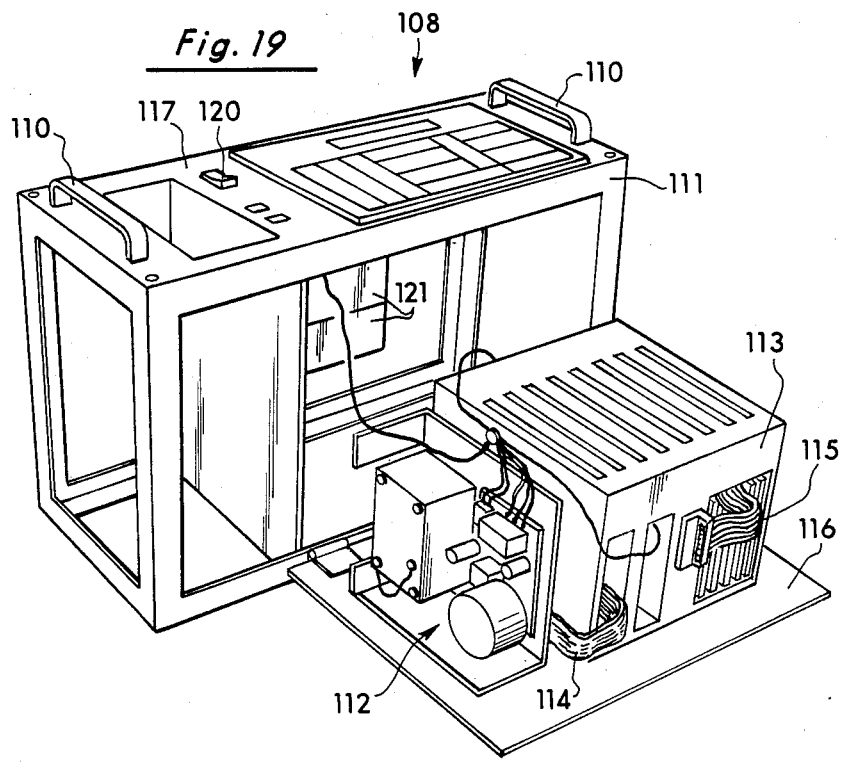
FIG. 19 discloses the field processor.

FIG. 19 shows further details of the field processor. As can be seen, the field processor comprises a frame 111, including handles 110 and a removable base plate 116 together with associated equipment mounted on the base plate 116. This equipment includes a power supply 112, batteries 121 and an assembly 113 for mounting the printed wiring boards comprising the field processor. Cables 114 and 115 interconnect the various portions of the field processor together.

Figure 20:
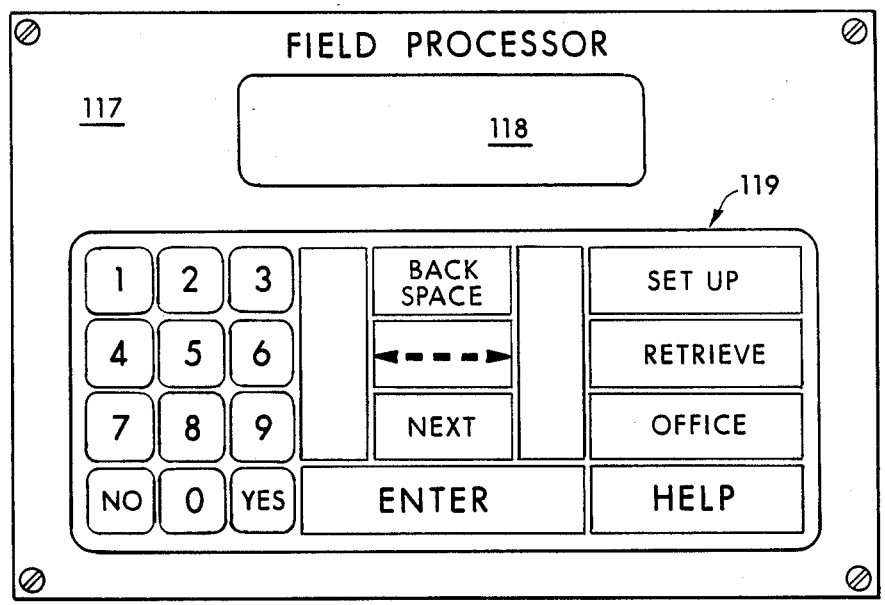
FIG. 20 discloses the display panel of the field processor.

FIG. 20 discloses further details of the keys and push buttons mounted on the display portion or top plate 117 of the field processor. As can be seen on FIG. 20, the top plate or control panel of the field processor comprises an LCD display 118 together with a plurality of control buttons 119.

The field processor is activated by turning on a control switch 120 and by then operating the various keys 119 of FIG. 20 to achieve the desired results. The operation of field processor is analogous to that of any currently available program controlled processor and therefore need only be described briefly. It is expressly understood that the field processor may in fact be substituted with such portable computers for example as: the Toshiba Model #1100, Kaypro Model #2000, or the IBM/Model PC Convertible. Any such conventionally available machines with easily obtainable industrial control software may suit the purpose of the so called field processor 108. The SETUP key is activated to set up or initialize the probe processor at the beginning of a test to include the self test operational routines. The RETRIEVE key is activated to retrieve data from the probe processor at the conclusion of a test. The OFFICE key is activated when data is to be transmitted from the field processor over a phone line or the like to an office computer. The HELP key is depressed whenever the field technician requires assistance in operating the field processor such as the manual stick measurement of the tank. The NUMERICAL DIGIT keys 0 through 9 are used to enter numerical data into the field processor such as the manual stick measurement of the tank. The YES and NO keys are used to provide answers to questions displayed on the LCD display 118 of the field processor. The ENTER key is depressed to enter data or commands into the field processor such as the manual stick measurement of the tank. The NEXT key is depressed to advance to the next program sequence. The BACKSPACE key is depressed to step backwards to correct error when using the 0 through 9 keys, etc. The ARROW keys are depressed to permit the field processor to return to a prior program sequence or advance to other program sequences.

It is also contemplated by the present invention to allow the field processor to load the probe 4 test data on to a conventional floppy memory disk so as to permit the transfer of test data to be mailed to the processing center for analysis in cases where telephone communications are not practical or convenient.

DESCRIPTION OF FIG. 21

Figure 21:
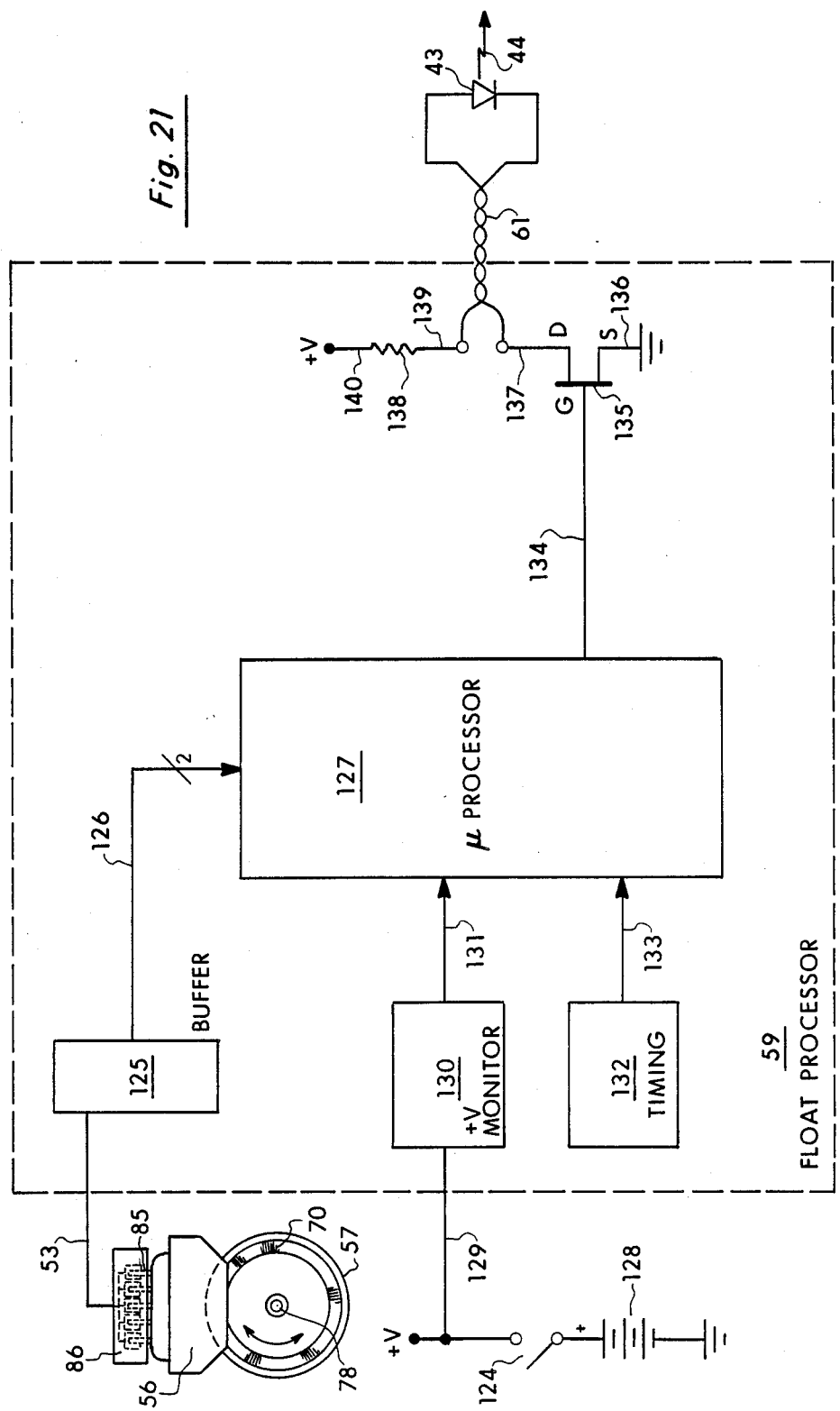
FIGS. 21, 22, 23, 24 and 25 disclose further details of the float processor.

FIG. 21 discloses further details of the float processor 59. In the upper lefthand corner of FIG. 21, the rotation of shaft 78 causes code wheel 57 to rotate and to interrupt a light beam which passes through the elongated slot opening 70 on code wheel 57 which is positioned within the U-shaped opening in the lower portion of decoder device 56. The U-shaped opening in device 56 is clearly shown on the top part of FIG. 7. Code wheel 57 and the decoder device 56 are commercially available components and have been identified in detail priorly in this specification.

The output signals of decoder device 56 are applied to its pins 85. Pins 85 engage connector 86 which is attached by means of the wires of cable 53 to the two channel buffer circuit 125 of the float processor 59. The output of buffer 125 is connected over path 126 to microprocessor 127.

Battery 128 provides power for the float processor 59 in the conventional manner. The power is applied to the float processor after switch 124 is turned to the ON position. At that time, battery power is connected over path 129 to the float power supply and voltage monitoring circuit 130 which, in turn, applies power over path 131 to the microprocessor 127. Element 130 is a conventional circuit whose purpose is to indicate energy levels of battery 128 when processor 127 interrogates element 130. Timing is provided to the float processor by means of the crystal timing circuit 132 which is connected over line 133 to the microprocessor 127. This provides for precision timing to the microprocessor 127.

The output of the microprocessor 127 is applied over path 134 to the "G" terminal of the field effect transistor (FET) 135. The "S" element of the FET is grounded at 136. The "D" element of the FET is connected via one wire of path 61 to the infrared LED 43. The other wire of path 61 is connected via a resistor 138 to the plus battery voltage. The FET device 135 is commonly available and is identified as a part number in VN0104.

In operation, the code wheel 57 rotates as it responds to changes in the level of the tank fluid 3. This rotation of code wheel 57 interrupts the light beam within the decoder device 56 to produce two channels of data representing (1) the number of times the light beam has been interrupted and (2) an indication as to the direction of rotation in which the code wheel 57 is turning. The wave form outputs of the buffer 125 on path 126 are subsequently described in detail in connection with FIGS. 22, 23, and 24.

Figure 24:
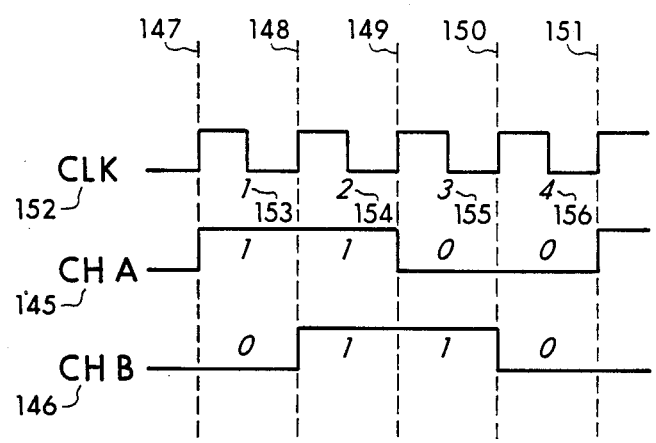

The microprocessor 127 counts the number of interruptions of the sensed light beam and amplifies the wave forms representing these interruptions as is subsequently described. Amplifies in this meaning refers to the "quadrature effects" as represented in FIG. 24. The sensed level data is represented in the form of pulsing the infrared LED 43. This creates an optical communication link which is transmitted upwards within the probe tube 22 to the probe processor 48 via the infrared path 44 shown on FIG. 5.

Although in the preferred embodiment all data generated by the probe 30 and the probe processor 59 is up-linked via the infrared beam 44 so the probe processor 48 can store the up-linked data for further analysis, it should be expressly understood that the float processor 59 can, if desired, include means of storing digital signal processing in such an alternative embodiment. In this embodiment, the float processor 59 may be most useful in permanently installed probe 4 devices. In such an embodiment, the float processor 59 can by itself perform extensive digital signal processing. In addition, it is also to be understood that within this alternative embodiment, an analysis of level, temperatures, and barometric pressures may occur within the probe processor 48 itself rather than being uploaded to external computers.

DESCRIPTION OF FIGS. 22, 23, AND 24

Figure 22:
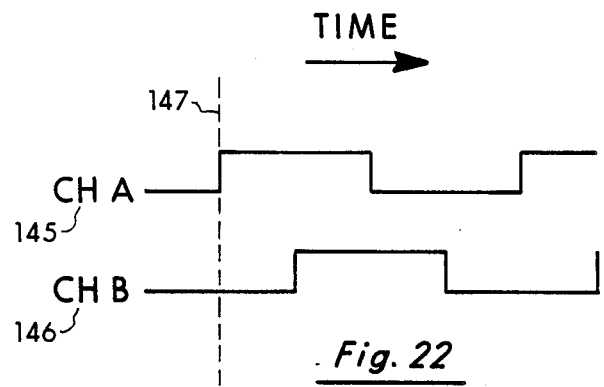
Figure 23:
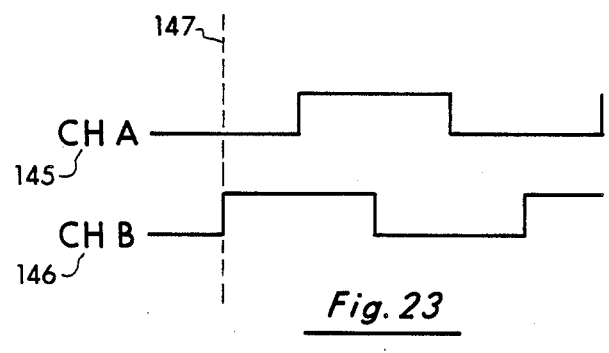

FIGS. 22, 23, and 24 disclose the wave forms which are produced by the encoder device 56 in the form of signals applied to path 53. The decoder device 56 generates two output wave forms. These two wave forms are designated as channel (CH) A and channel (CH) B on each of FIGS. 22, 23, and 24. Channel A is identified by the reference numeral 145 while channel B is identified by the reference numeral 146 on each of FIGS. 22, 23, and 24.

In FIG. 22, the channel A wave form is shown as leading the channel B wave form at the time represented by the dotted line 147. FIG. 22 is thereby indicative of the code wheel 57 rotating counter clockwise in response to a lowering of the tank fluid 3. Conversely, in FIG. 23, the channel B wave form 146 is advanced over that of the channel A wave form 145 at the time represented by dotted line 147. This condition is indicative of a clockwise rotation of the code wheel and a rising of the tank fluid 3.

Microprocessor 127 digitally amplifies the signals of FIGS. 22 and 23 as shown in FIG. 24. FIG. 24 discloses the digital amplification. Here a clock signal 152, a channel A signal 145, and a channel B signal 146 are represented. It further shows these signals being divided time wise by the vertical dotted lines identified as elements 147 through 151. The channel A signal 145 between times 147 through 151 represents the output signal for channel A caused by a single interruption of the light beam through a slot 70 of code wheel 57 moving in a counter clockwise direction. At time interval 148, the value of the channel A signal 145 is compared to the value of the channel B signal and an output signal is generated under control of the clock signal 152 to produce a digital value of 1 as indicated by the reference numeral 153. Similarly, as time intervals 148, 149, 150, and 151 coincide with the channel A and B signals 145 and 146 and the processor clock signal 152, the microprocessor 127 generates an output signal indicating the digital values of 2, 3, and 4 as represented by the reference numerals 154, 155, and 156 respectively. This digital amplification process is generally known in the art as quadrature signal processing.

In operation, the microprocessor 127 can sectionalize or divide each signal 145 and 146 into four separate and distinct signals as represented by the digits associated with reference numerals 153 through 156. Thus, by means of this quadrature signal processing, the processor can determine from a comparison of the channel A and channel B signals which signal is leading and thereby determine whether the tank fluid is rising or lowering. Further, by means of the quadrature signal processing, the microprocessor 127 can determine which quadrant of a cycle to which the code wheel has rotated. This increases the accuracy of the probe and thereby allows the indications of changes in fluid level to be determined with greater precision.

DISCUSSION OF FIG. 25

Figure 25:
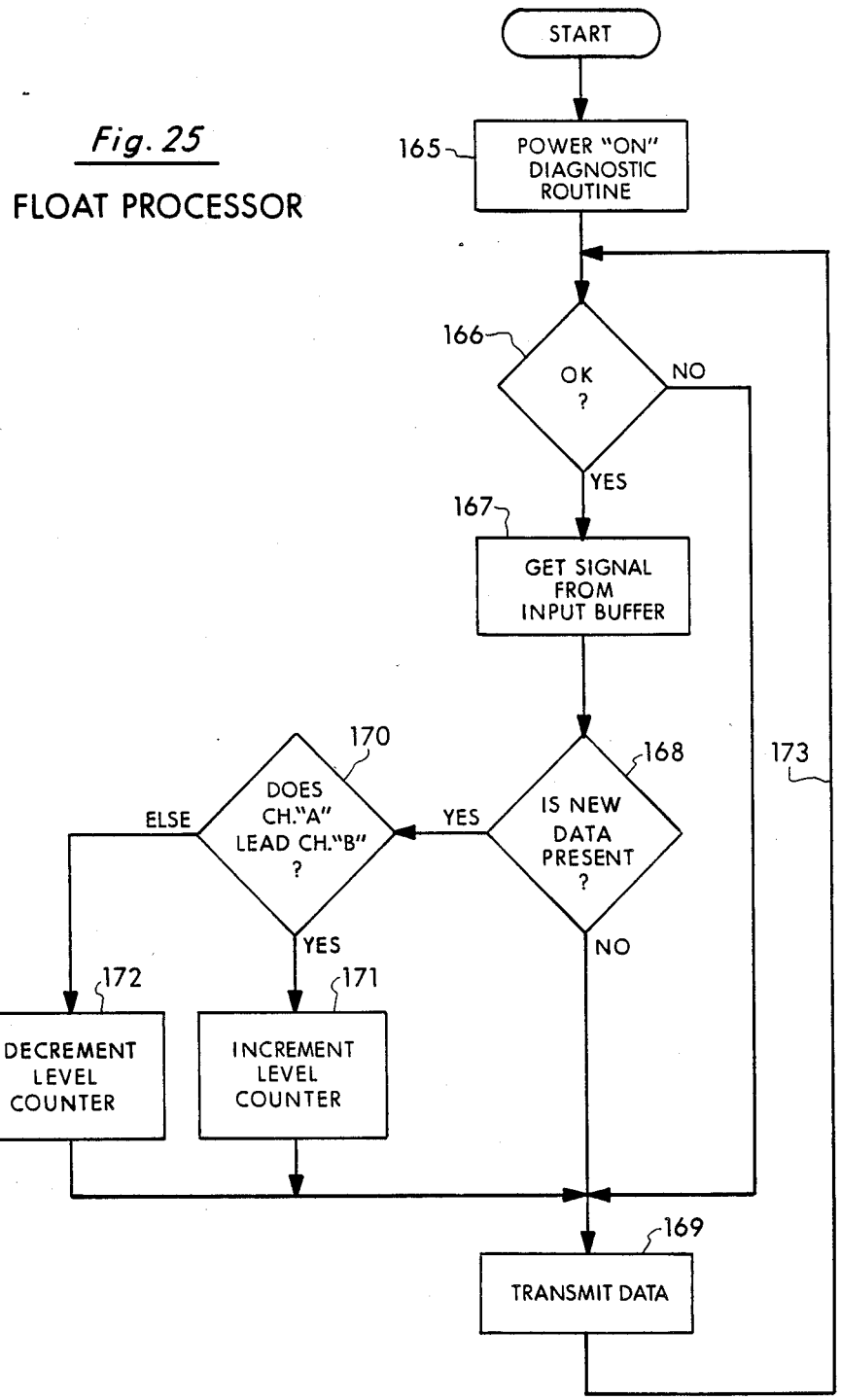

FIG. 25 discloses further details of the operation of the float processor 59. Upon act of the power switch 124 of the float processor on FIG. 21, a self diagnostic routine 165 on FIG. 25 is initiated by microprocessor 127 (FIG. 21). This diagnostic routine 165 automatically checks out the operation of all the electronics and associated equipment of the float processor 59. Included in the things that are tested are battery voltage. The process advances from element 165 on FIG. 25 to element 166 which determines whether or not all of the tested criteria of the float processor tests okay. If the answer is YES, the process advances to element 167 which gets a signal from the input buffer element 125 of FIG. 21. The data acquired from the buffer 125 is presented to element 168 of FIG. 25 which makes a determination as to whether or not the acquired data represents new data or represents data that is unchanged from the previous reading. If the answer of element 168 is NO, then the old data that was recently read from buffer 125 is applied to element 169 which controls processor 59 so that the old data is then applied via the field effect transistor 135 to infrared LED 43 for transmission upward on the infrared beam to the probe processor 48.

If the element 168 makes a YES determination indicating that the acquired data is new data, then the process advances to element 170 which determines whether channel A does or does not lead channel B as shown on FIGS. 22 and 23. The process then advances either to element 171 or 172 depending on the answer generated by element 170. If the fluid level is rising, then channel A leads channel B and the process advances over the YES output of element 170 to element 171 which increments a level counter within the microprocessor 127. On the other hand, if the level of the tank fluid is falling, then channel B leads channel A and the process advances over the ELSE output of element 170 to element 172 which decrements the level counter within the microprocessor.

The process then advances either from blocks 171 or 172 to the element 169 which transmits the new change in fluid level information via the infrared LED in the infrared beam to the probe processor as priorly discussed. Each time that element 169 causes data to be transmitted, the data is transmitted over the infrared beam 44 and indicates either that the fluid level has not changed or, if it has changed, that it has either risen or has lowered. The process then advances from element 169 over path 173 back to the element 166 which begins a new cycle. Also, if the NO output of element 166 is activated at any time, the process advances directly from the NO output of element 166 to element 169 which transmits information up on the infrared beam indicating that the diagnostic routine did not properly run.

DESCRIPTION OF FIG. 26

Figure 26:
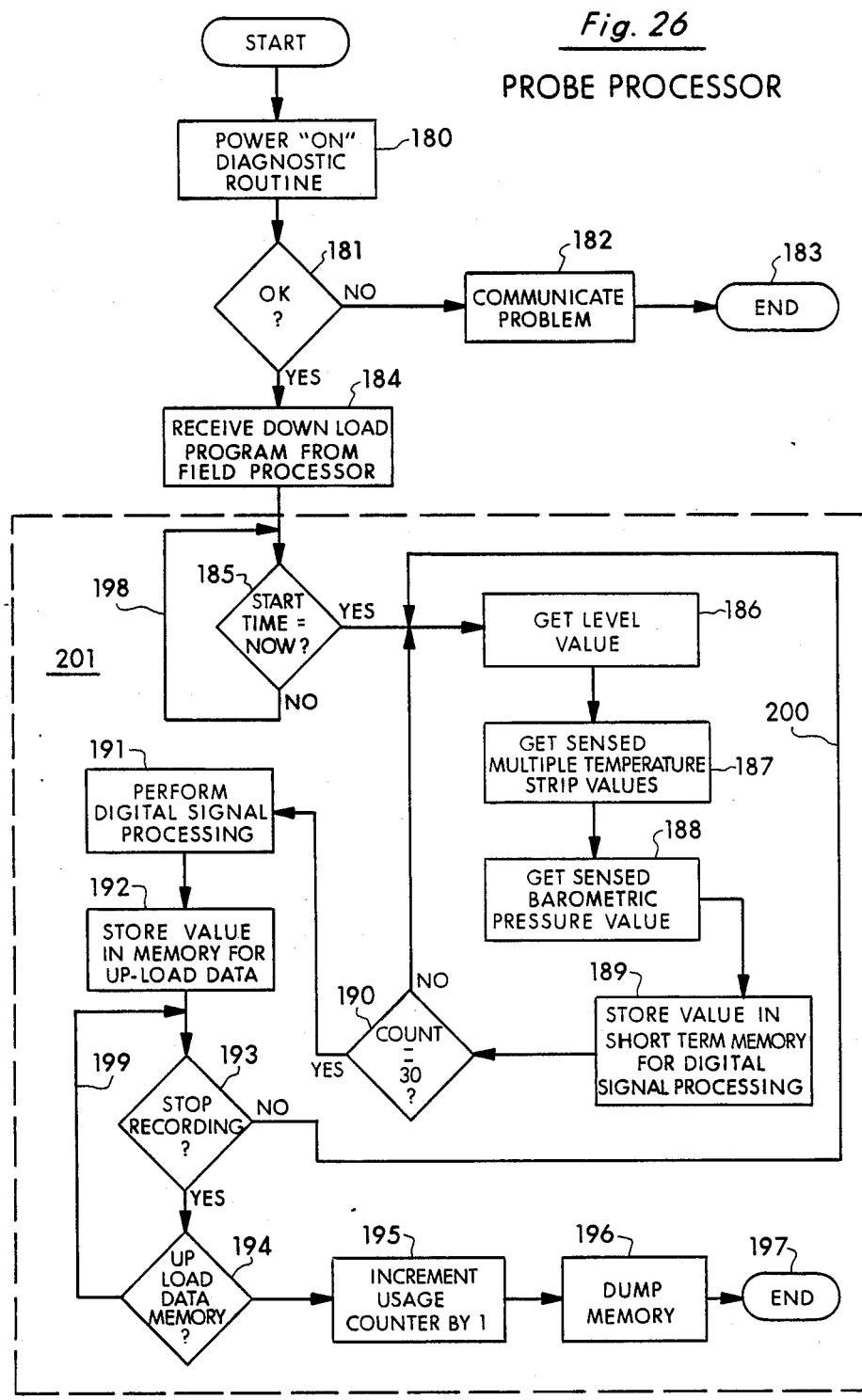
FIG. 26 discloses further details of the probe processor.

FIG. 26 discloses further details of the probe processor 48. Upon activation of the power switch 106 for the probe processor, the self diagnostic routine 180 automatically checks the operation of the various elements of the processor and further checks out various system parameters such as battery voltages. If all of these check "ok" by element 181, the process advances over the YES output of element 181 to element 184. If some parameter does not check "ok", the process advances out over the NO output to element 182 which transmits information to the field processor 108 indicating that the probe processor is not fully operable. The process then ends in element 183.

In element 184, the probe processor receives a download program 201 from the field processor. The download program 201 comprises the program routines that the probe processor is to execute in the preferred embodiment of the invention.

The process next advances from element 184 to element 185 which comprises the first step in the execution of the down-loaded program 201 that the probe processor receives from the field processor. In element 185, the process waits for the reception of a "start run" command. This command is included in the down-loaded program received from the field processor and could indicate various alternative start times. First of all, it can indicate an immediate start time for the START RUN command. It can also include a time delay of a predetermined amount of time for the beginning of the START RUN command. Also, it can include a predetermined default START RUN command time. In any case, if the indicated time to start does not equal "NOW?", the routine loops back to itself over path 198. When the question of element 185 is satisfied, the element causes the process to advance out over the YES output to element 186. In process 186, the probe processor gets the liquid level data which is received at the infrared photo detector 47 via the infrared beam 44 which is transmitted up from the float processor 59 to the probe processor as described priorly in connection with the description of the flow chart of FIG. 25. The process then advances from element 186 to element 187 which reads the multiple temperature information from the temperature sensors 29 located throughout the length of the probe 4 on the strips 27, 36, and 38. The process then advances from element 187 to 188 which enters the barometric pressure information into the probe processor. The process then advances from element 188 to element 189 which causes the values derived by elements 186, 187 and 188 to be stored in a short term memory for subsequent digital signal processing.

The process next advances from element 189 to element 190. Element 190 keeps track of how many times the probe processor has performed the task associated with elements 186, 187, and 188. If the count equals a predetermined number (such as 30 in the preferred embodiment), the YES output of element 190 is activated and the process advances from element 190 to element 191. On the other hand, if the count is less than 30, then the process advances out over the NO output and loops back to the input of element 186 where the above described sequence is performed once again by elements 186, 187, 188, and 189 until such time as the count determined by element 190 does equal 30.

In routine 191, the probe processor performs digital signal processing on the 30 different saved values stored in the short term memory of the probe processor in connection with element 189. The details of this signal processing have been priorly described. The values which result from the execution of process 191 are stored in the probe processor memory by element 192 for subsequent upload and transfer to the field processor. The process next advances from element 192 to element 193. Element 193 monitors either the termination of a specified period of time for the tests, or the utilization of the maximum amount of available memory to store the test data. In connection with this, it asks the question as to whether the recording of data should be terminated. If the answer is NO to this question, the process returns to the beginning of element 186 over path 200 which causes the above-described sequence to be repeated one or more times. If the answer to the question asked by element 193 is YES, the process advances out over the YES output of element 193 to element 194. Element 194 determines whether or not the stored data generated by element 192 should be uploaded and transferred to the field processor at this time. If, at this time, the field processor is not available and connected to the probe processor, the answer to the question is NO and the process loops back over path 199 to the input of element 193 and the functions performed by elements 193 and 194 are repeated until such time as the field processor is available and connected to the probe processor. This connection is made via plug 107 as priorly described. When the connection is made, the probe processor is requested to upload its stored information to the field processor. At this time, the YES output of element 194 is activated and the process advances to element 195 which increments a usage counter within the probe processor by one. The process then advances to element 196 which causes the stored information in the probe processor to be transferred to the field processor as previously discussed in connection with element 192. The process is now complete when it advances from element 196 to element 197.

It is to be expressly understood that it is contemplated, in accordance with the present invention, that the probe processor program 201 could cause element 192 to be uploaded at the completion of each data point processed by element 191. This would be particularly useful in a "real time" embodiment of the invention which would display the test by the field processor 108 where the cable between the field processor 108 and the probe processor 48 is kept connected through the use of a special fill pipe cap 7 which has the capacity to receive the cable. Such real time observation of tank behavior is useful to demonstrate to the tank owner/operator the effectiveness of the tank testing probe. It is also useful in any other situation in which it is desirable that real time information pertaining to the tank leakage be made instantaneously available for any reason whatsoever.

While preferred embodiments of the present invention have been shown, it is to be expressly understood that modifications and changes may be made thereto and that the present invention is set forth in the following claims.

I claim:

1. A method of determining information including information indicating the leakage of liquid in storage tanks, said method comprising the steps of:
    inserting self contained measuring apparatus into a tank whose leakage is to be measured,
    operating said apparatus to obtain a plurality of data readings at different times indicating the instantaneous tank liquid level at the time of each reading,
    storing the data collected during each reading in said apparatus,
    subsequently connecting said apparatus to a computer,
    transferring said stored data from said apparatus to said computer, and
    operating said computer to process said data to determine the leakage rate of said tank.

2. The method of claim 1 wherein said tanks have fill pipes and wherein said method further comprises the steps of:
inserting said apparatus in said tank so that the entirety of said apparatus is below the top of the fill pipe of said tank, and
inserting a fill pipe cap on said fill pipe.

3. The method of claim 2 wherein said cap is a locking type cap.

4. The method of claim 1 in combination with the steps of:
operating said apparatus to sense the temperature at different strata within said tank,
recording data indicating the temperature sensed for each strata, and
transferring said temperature data together with said stored liquid level data to said computer for use by said computer in determining said tank leakage information.

5. The method of claim 4 in combination with the steps of:
operating said apparatus to sense barometric pressure information,
recording said pressure information in said apparatus, and
transferring said recorded barometric pressure information to said computer together with said temperature data and said stored liquid level data for use in determining said tank leakage information.

6. A method of determining information including information indicating the leakage of liquid in storage tanks, said method comprising the steps of:
inserting self contained measuring apparatus into a tank whose leakage is to be measured wherein said inserted apparatus comprises a vertically oriented hollow tube, a probe processor in the upper portion of said tube, and a float including a float processor suspended in said liquid in the lower portion of said tube,
operating said float processor to generate a plurality of data readings at different times indicating the instantaneous tank liquid level at the time of each reading,
transmitting said data for each reading from said float processor to said probe processor,
recording the transmitted data for each reading in said probe processor,
subsequently removing said apparatus from said tank,
connecting said probe processor to a computer,
transferring said stored data from said probe processor to said computer, and
operating said computer to process said data to determine the leakage rate of said tank.

7. The method of claim 6 wherein said step of transmitting includes the steps of:
encoding said generated data readings into an encoded optical signal,
transmitting said optical signal upwards within said tube,
receiving said optical signal by a photo detector, and
applying a signal representing said generated data from said detector to said probe processor.

8. The method of claim 7 in combination with the steps of:
operating said probe processor to sense the temperature at different strata within said tank,
recording data indicating the temperature sensed for each strata, and
transferring said temperature data together with said stored liquid level data to said computer for use by said computer in determining said tank leakage information.

9. The method of claim 8 in combination with the steps of:
operating said apparatus to sense barometric pressure information,
recording said pressure information in said apparatus, and
transferring said recorded barometric pressure information to said computer together with said temperature data and said stored liquid level data for use in determining said tank leakage information.

10. Self contained measuring apparatus adapted to be inserted into a tank whose leakage of stored liquid is to be measured, said apparatus comprising:
means for obtaining a plurality of data readings at different times indicating the instantaneous tank liquid level at the time of each reading,
means for storing said data collected during each reading in said apparatus,
means for subsequently connecting said apparatus to a computer, and
means for transferring said stored data from said apparatus to said computer,
said computer being operable to process said data to determine the leakage rate of said tank.

11. The apparatus of claim 10 in combination with:
means for sensing the temperature at different strata within said tank,
means for recording data indicating the temperature sensed for each strata, and
means for transferring said temperature data together with said stored fluid level data to said computer for use by said computer in determining said tank leakage information.

12. Self contained measuring apparatus adapted to be inserted into a tank whose leakage of stored liquid is to be measured wherein said inserted apparatus comprises a vertically oriented hollow tube, a probe processor in the upper portion of said tube, and a float including a float processor suspended in said liquid in the lower portion of said tube, said apparatus further comprising:
means for operating said float processor to generate a plurality of data readings at different times indicating the instantaneous tank liquid level at the time of each reading,
means for transmitting said data for each reading from said float processor to said probe processor,
means for recording the transmitted data for each reading in said probe processor, and
means for connecting said probe processor to a computer for the transfer of said stored data from said probe processor to said computer,
said computer being operable to process said data to determine the leakage rate of said tank.

13. The apparatus of claim 12 wherein said means for transmitting includes:
means for encoding said generated data readings into an encoded optical signal,
means for transmitting said optical signal upwards within said tube,
means for receiving said optical signal, and
means for applying a signal representing said generated data from said detector to said probe processor.

14. Apparatus for determining information including information indicating the leakage of liquid in a storage tank, said apparatus comprising:
  a probe processor in the upper portion of said tank,
  a float suspended in said liquid,
  a first means on said float for determining the instantaneous level of said tank liquid,
  a second means on said float for transmitting data to said probe processor representing said determined fluid level at successive times,
  said probe processor being operable for recording said transmitted level data, and
  means for transferring said recorded data from said probe processor to an external computer to determine said tank leakage rate from said transferred data.

15. The apparatus of claim 14 in combination with:
  means for sensing the temperature within said tank at different strata within said tank,
  said probe processor being operable for recording data indicating the temperature sensed for each strata, and
  means for transferring said recorded temperature data along with said stored liquid level data to said computer for use in determining said tank leakage information.

16. The apparatus of claim 15 wherein said probe processor is operable for sensing and recording barometric pressure information, said apparatus further comprising means for transferring said recorded barometric pressure information to said computer together with said recorded temperature data and said stored liquid level data for use in determining said tank leakage information.

17. Apparatus for determining information including information indicating the leakage of liquid in a storage tank, said apparatus comprising:
  a hollow probe tube suspended vertically in said tank with at least a lower portion of said probe tube being immersed in said liquid in said tank,
  a probe processor and a receiver in the upper inner portion of said tube,
  a float suspended below said probe processor in said liquid within said tube,
  encoder means mounted on said float within said tube for determining the instantaneous level of said tank liquid,
  a float processor mounted on said float within said tube and responsive to said determination by said encoder means for transmitting data to said receiver representing said liquid level at successive times,
  said probe processor being operable for recording said transmitted level data, and
  means for transferring said recorded data to an external computer to determine said tank leakage.

18. The apparatus of claim 17 wherein said float comprises:
  centering means for positioning said float within the center of said tube and away from the inner surface of said tube while permitting said float to move vertically with low hysteresis in response to changes in tank fluid level.

19. The apparatus of claim 18 wherein said centering means comprises:
  a first vertically oriented member affixed to the bottom of said float,
  a plurality of vertically oriented wheels affixed by spring loading means to said member and radially spaced from each other about the vertical axis of said member, each of said wheels bearing under control of said spring loading means against the inner surface of said tube to center the lower portion of said float within said tube,
  a second vertically oriented member affixed to the top portion of said float,
  a plurality of spring loaded vertically oriented wheels affixed by spring loading means to said second member and vertically spaced from each other about the vertical axis of said member, each of said wheels bearing under control of said spring loading means against the inner surface of said tube to center the upper portion of said float within said tube while maintaining contact between said friction wheel periphery and the inner surface of said tube.

20. The apparatus of claim 19 in combination with a first spring fixed to the lower portion of said first vertical member and a second spring positioned above said float to cushion said float against large magnitude downward and upward vertical shocks.

21. The apparatus of claim 19 wherein said encoder means comprises:
  a data transducer,
  a code wheel having radial slots for sequentially interrupting and enabling a high beam generated by said transducer as said code wheel rotates in response to changes in fluid level, and
  means responsive to said interruption for generating output data indicating the direction and amount of rotation of said code wheel.

22. The apparatus of claim 21 in combination with:
  an infrared beam generator,
  means for applying output signals from said float processor to said infrared generator for generating a coded infrared beam containing said data that is transmitted to said receiver, and
  means in said receiver for receiving and decoding said infrared beam to derive said transmitted data.

23. The apparatus of claim 19 in combination with:
  means for operating said apparatus to sense the temperature at different strata within said tank,
  means for recording data indicating the temperature sensed for each strata, and
  means for transferring said temperature data with said stored liquid level data to said computer for use by said computer in determining said tank leakage information.

24. The apparatus of claim 23 in combination with:
  apparatus for operating said apparatus to sense barometric pressure information,
  means for recording said pressure information in said apparatus, and
  means for transferring said recorded barometric pressure information to said computer together with said temperature data and said stored liquid level data for use in determining said tank leakage information.

25. A method of determining information including information indicating the leakage of liquid in storage tanks, said method comprising the steps of:
  inserting self contained measuring apparatus into a tank whose leakage is to be measured,
  operating said apparatus to obtain a plurality of data readings at different times indicating the instantaneous tank liquid level at the time of each reading, transmitting information representing said data readings over an infrared beam from a lower portion to an upper portion of said apparatus, storing the data transmitted over said infrared beam in said apparatus, subsequently connecting said apparatus to a computer, transferring said stored data from said apparatus to said computer, and operating said computer to process said data to determine the leakage rate of said tank.

26. Self contained measuring apparatus adapted to be inserted into a tank whose leakage of stored liquid is to be measured, said apparatus comprising:

means for obtaining a plurality of data readings at different times indicating the instantaneous tank liquid level at the time of each reading, means for transmitting information representing said date readings over an infrared beam from a lower to an upper portion of said apparatus, means for storing said data transmitted over said infrared beam in said apparatus, means for subsequently connecting said apparatus to a computer, and means for transferring said stored data from said apparatus to said computer.

* * * * *